(12) United States Patent
Mizuno et al.

(10) Patent No.: US 8,042,419 B2
(45) Date of Patent: Oct. 25, 2011

(54) VEHICLE TRANSMISSION

(75) Inventors: Kinya Mizuno, Saitama (JP); Hiromi Sumi, Saitama (JP); Masako Takahashi, Saitama (JP); Masaki Kobayashi, Saitama (JP); Eiji Kittaka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 883 days.

(21) Appl. No.: 12/055,020

(22) Filed: Mar. 25, 2008

(65) Prior Publication Data

US 2008/0236316 A1    Oct. 2, 2008

(30) Foreign Application Priority Data

Mar. 28, 2007   (JP) .................... 2007-083263

(51) Int. Cl.
*F16H 63/18*   (2006.01)
(52) U.S. Cl. ....................................... 74/337.5
(58) Field of Classification Search ................. 74/337.5
See application file for complete search history.

(56) References Cited

U.S. PATENT DOCUMENTS

| | | | | |
|---|---|---|---|---|
| 1,257,417 | A * | 2/1918 | Sperry | 74/334 |
| 2,529,379 | A * | 11/1950 | Dumont | 192/3.62 |
| 5,590,563 | A * | 1/1997 | Kuwahata et al. | 74/337.5 |
| 6,370,976 | B1 * | 4/2002 | Doppling et al. | 74/337.5 |

FOREIGN PATENT DOCUMENTS

JP   62-8683 Y2   2/1987

\* cited by examiner

*Primary Examiner* — Sherry Estremsky
(74) *Attorney, Agent, or Firm* — Birch, Stewart, Kolasch & Birch, LLP

(57) ABSTRACT

An outer circumference of a shift drum of a vehicle transmission is provided with at least one particular lead groove among multiple lead grooves which continuously extends beyond one circle of the shift drum. Two ends of the particular lead groove are arranged so as to be out of alignment with each other in the axial direction of the shift drum. A common shift position adapted to establish gear trains with two shift stages different from each other is set at one position corresponding to the two ends of the particular lead groove along the circumferential direction of the shift drum. The resulting configuration prevents an increase in the diameter of a shift drum and eliminates the significant change of the shape of a lead groove, even as the number of shift positions set on the shift drum is increased.

20 Claims, 16 Drawing Sheets

VEHICLE TRANSMISSION

CROSS-REFERENCE TO RELATED APPLICATION

The present application claims priority under 35 U.S.C. §119 to Japanese Patent Application No. 2007-083263, filed Mar. 28, 2007, the entire contents of which are hereby incorporated by reference.

BACKGROUND OF THE INVENTION

1. Field of the Invention

The present invention relates to a vehicle transmission including gear trains with a plurality of shift stages which can selectively be established; a shift drum provided in the outer with at least one circumferentially extending lead groove; drive means for rotatably driving the shift drum; a shift fork which has a shift pin slidably engaged with the lead groove and switches the established states of the gear trains with gear stages according to the operation resulting from the turning of the shift drum.

2. Description of Background Art

Such a vehicle transmission is known from e.g. patent document 1, in which, to alternatively establish gear trains with a plurality of shift stages, shift positions corresponding to the respective gear trains are set so as to be spaced from each other in the circumferential direction of the shift drum.

However, in the vehicle transmission configured as disclosed in Japanese Utility Model Publication No. 62-8683, to increase the shift positions set on the shift drum, the increased diameter of the shift drum enlarges the transmission and the significant change of the shape of a lead groove increases design manhours.

SUMMARY AND OBJECTS OF THE INVENTION

The present invention has been made in view of the foregoing and it is an object of the present invention to provide a vehicle transmission that can prevent an increase in the diameter of the shift drum and eliminate the significant change of the shape of a lead groove even if the number of shift positions set on the shift drum is increased.

To achieve the above object, according to an embodiment of the present invention, a vehicle transmission is provided. The vehicle transmission includes gear trains with a plurality of gear stages which can selectively be established. An outer circumference of a shift drum is provided with at least one circumferentially extending lead groove. Drive means are provided for rotatably driving the shift drum; and a shift fork which has a shift pin slidably engaged with the lead groove and switches the established states of the gear trains with gear stages according to operation resulting from the turning of the shift drum.

The shift drum is provided on the outer circumference thereof with at least one particular lead groove among the lead grooves which continuously extends beyond one circle of the shift drum and with both ends of the second lead groove which are arranged so as to be out of alignment with each other in the axial direction of the shift drum, and a common shift position adapted to establish gear trains with two shift stages different from each other is set at one position corresponding to both the ends of the particular lead groove along the circumferential direction of the shift drum.

According to an embodiment of the present invention, the particular lead groove is formed to be stepwise offset to one side of the shift drum in the axial direction thereof as it goes from the one end of thereof to the other end.

According to an embodiment of the present invention, the common shift position is set on the shift drum at a position corresponding to both ends of the particular lead groove so as to establish a reverse gear train or a first-speed gear train and a highest shift stage gear train, a control unit which controls operation of the drive means according to turning angle detection of a turning angle detector which detects a turning angle of the shift drum, at the time of operation of the engine, determines that the reverse gear train or the first-speed gear train is established when the shift drum is turned to a downshift side from a shift position adjacent, from an upshift side, to the common shift position and that the highest shift stage gear train is established when the shift drum is turned to the upshift side from a shift position adjacent, from the downshift side, to the common shift position.

According to an embodiment of the present invention, the common shift position is set on the shift drum at a position corresponding to both the ends of the particular lead groove so as to establish a reverse gear train and a highest shift stage gear train, and the control unit which controls operation of the drive means according to a turning angle detected by a turning angle detector which detects a turning angle of the shift drum, at the time of start of the engine, determines approval/disapproval of start of the engine when the control unit determines that the shift drum is at the common shift position on the basis of a detection result of the turning angle detector.

According to an embodiment of the present invention, the control unit performs: a first step, in determining start approval/disapproval of the engine, of prohibiting the start of the engine in a state where the shift drum is at the common shift position; a second step of operating the drive means so that the shift drum may be turned to the upshift side by one stage; and a third step of determining whether or not the shift drum has been turned to a shift position adjacent, from the upshift side, to the common shift position in the upshift process of the second step.

In addition, the control performs a fourth step of permitting the start of the engine if the third step has determined that the shift drum was turned to the neutral position adjacent, from the upshift side, to the common shift position by the upshift process of the second step; a fifth step of operating the drive means so that the shift drum may be turned to the downshift side when the third step has determined that the shift drum was not turned to the neutral position adjacent, from the upshift side, to the common shift position by the upshift process of the second step; and a sixth step of determining whether or not the shift drum is turned to the shift position adjacent, from the downshift side, to the column shift position in the downshift process of the fifth step.

Further, the control unit performs a seventh step of determining that a gear train corresponding to a shift position adjacent, from the downshift side, to the common shift position is established among the gear trains with a plurality of shift stages when the sixth step confirms that the shift drum has been turned to a shift position adjacent, from the downshift side, to the common shift position; and an eighth step of determining that a fail state arises when the sixth step confirms that the shift drum has not been turned to the shift position adjacent, from the downshift side, to the common shift position.

According to an embodiment of the present invention, after the start approval/disapproval determination process for the engine, upon receipt of an engine start signal, the control unit starts the engine if the shift drum is at the neutral position, and starts the engine only during receiving a brake operation signal when at least one of the gear trains with the plurality of shift stages is established.

Incidentally, the second lead groove 97 of the embodiment corresponds to the particular lead groove of the present invention.

Effects of the present invention include the following:

According to the embodiment of the present invention, at least one particular lead groove among the lead grooves formed on the shift drum continuously extends beyond one circle of the shift drum and both ends of the second lead groove are arranged so as to be out of alignment with each other in the axial direction of the shift drum, and the common shift position adapted to establish gear trains with two shift stages different from each other is set on the shift drum at one position corresponding to both the ends of the particular lead groove. Thus, the number of the shift positions set on the shift drum can be increased while the enlargement of the transmission resulting from the increased diameter of the shift drum is avoided and an increase in design manhours is avoided by eliminating the significant modification of the shape of the lead groove.

According to the embodiment of the present invention, the particular lead groove is formed to be stepwise offset to one side of the shift drum in the axial direction thereof as it goes from the one end thereof to the other end. Thus, while both the ends of the particular lead groove are arranged to be out of alignment with each other in the axial direction of the shift drum, the axial enlargement of the shift drum can be prevented without an influence on the operation of the shift fork.

According to the embodiment of the present invention, although the reverse gear train or first gear train and the highest shift stage gear train are established at one and the same position in the circumferential direction of the shift drum, it can reliably be determined by the single turning angle detector which one of the shift stage using the reverse gear train GR or the first-speed gear train and the highest shift stage is produced.

According to the embodiment of the present invention, since the engine start approval/disapproval process is performed at the time of starting the engine, the shift position can reliably be confirmed even if the shift drum is at the common shift position.

According to the embodiment of the present invention, the start of the engine is permitted only when the shift drum is at the neutral position. The fail process can be performed as abnormality occurs when the shift drum is not moved to the neutral position from the established state of the reverse gear train even by the upshift process or the established state of the highest shift stage gear train is not brought to the established state of the shift stage lower, by one stage, than the highest shift stage by the downshift process.

According to the embodiment of the present invention, even if the operation is performed to start the engine after the engine has been stopped will the established state of the reverse gear train or forward gear train, control can be exercised not to perform forward or rearward movement.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
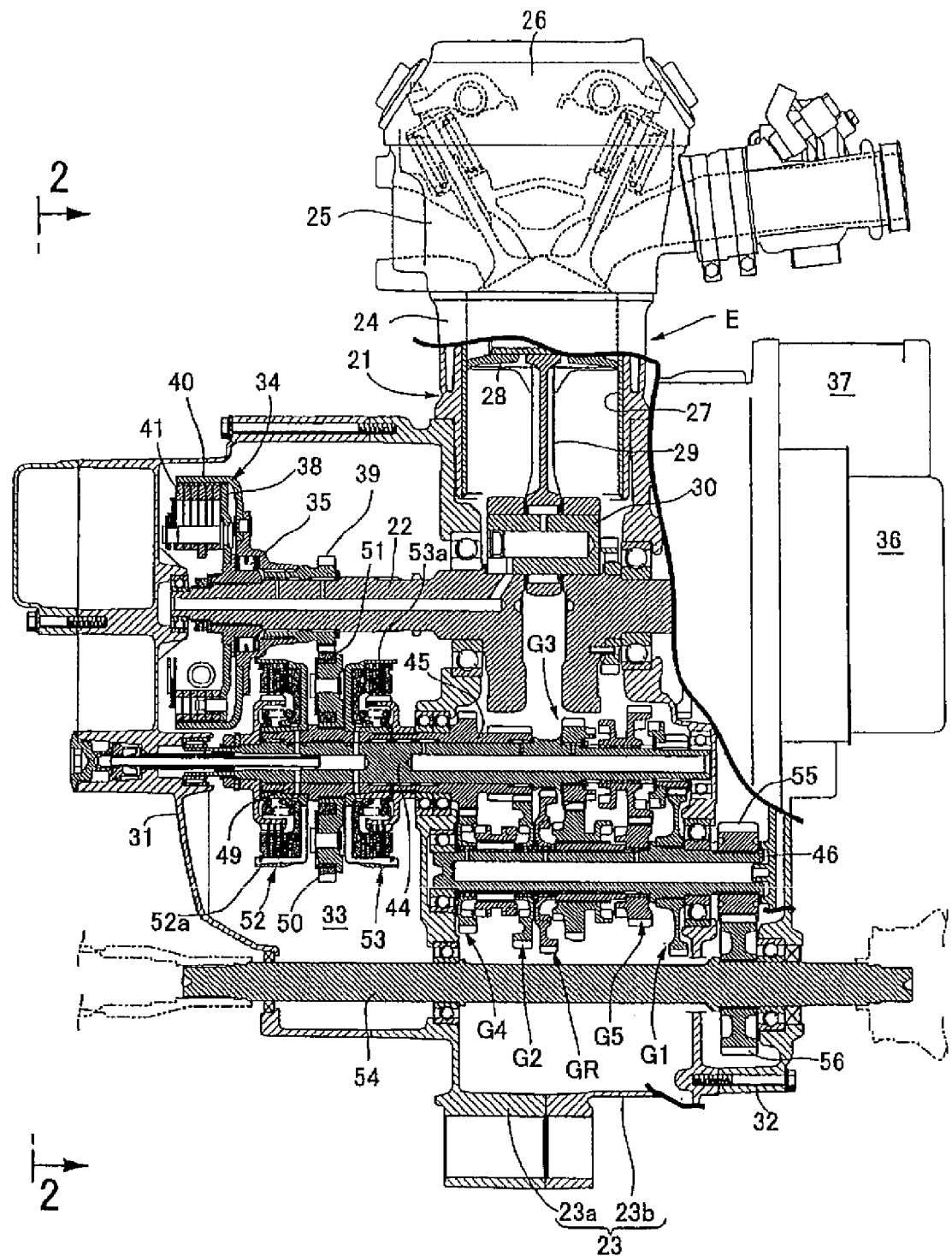
FIG. 1 is a longitudinal cross-sectional view of an engine main body, taken along line 1-1 of FIG. 2.

Referring first to FIG. 1, an engine main body 21 of an engine E mounted on e.g. an all terrain vehicle (ATV) includes a crankcase 23, a cylinder block 24, a cylinder head 25, and a head cover 26. The crankcase 23 rotatably journals a crankshaft 22 having an axial line extending vehicle-widthwise (a direction parallel to the sheet surface of FIG. 1). The cylinder block 24 is joined to the upper portion of the crankcase 23. The cylinder head 25 is joined to the upper portion of the cylinder block 24. The head cover 26 is joined to the upper portion of the cylinder head 25. A piston 28 slidably fitted into the cylinder bore 27 of the cylinder block 24 is connected to the crankshaft 22 via a connecting rod 29 and via a connecting pin 30.

The crankcase 23 is composed of a pair of case half bodies 23a, 23b joined together at a plane perpendicular to the rotational axis of the crankshaft 22. First and second crankcase covers 31, 32 are respectively fastened to both sides of the crankcase 23. A clutch housing chamber 33 is defined between the crankcase 23 and the first crankcase cover 31.

One end of the crankshaft 22 projecting from the crankcase 23 is journaled by the first crankcase cover 31. A centrifugal clutch 34 housed in the clutch housing chamber 33 is attached via a one-way clutch 35 to one end of the crankshaft 22 at a position close to the first crankcase cover 31. A generator (not shown) disposed between the crankcase cover 23 and the second crankcase case cover 32 and a recoil starter 36 attached to the second crankcase cover 32 are each connected to the other end of the crankshaft 22 extending from the crankcase 23. A starter motor 37 is attached to the second crankcase cover 32 in order to apply starting power to the crankshaft 22.

The centrifugal clutch 34 includes a drive plate 38 secured to the crankshaft 22; a bowl-like clutch housing 40; and a clutch weight 41. The clutch housing 40 coaxially covers the drive plate 38 so as to be rotated together with a drive gear 39 relatively rotatably carried on the crankshaft 22. The clutch weight 41 is rotatably supported by the drive plate 38 so as to enable frictional engagement with the inner circumference of the clutch housing 40 in response to action of a centrifugal force resulting from rotation of the crankshaft 22. The one-way clutch is interposed between the clutch housing 40 and the drive plate 38 so as to enable power transmission from the drive shaft 39 to the crankshaft 22.

Figure 2:
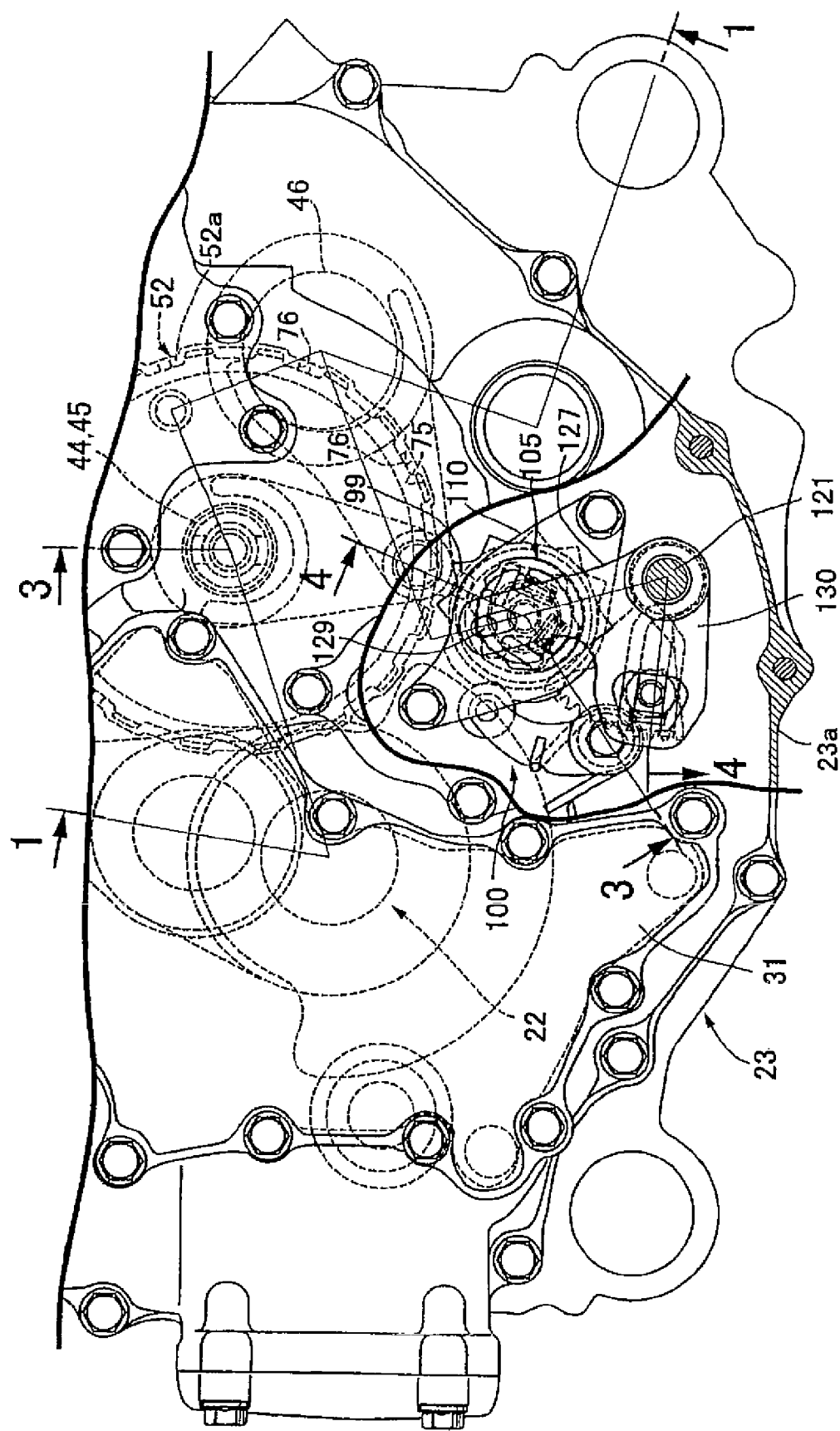
FIG. 2 is a partial cutaway lateral view as viewed from the arrow direction of line 2-2 of FIG. 1.
Figure 3:
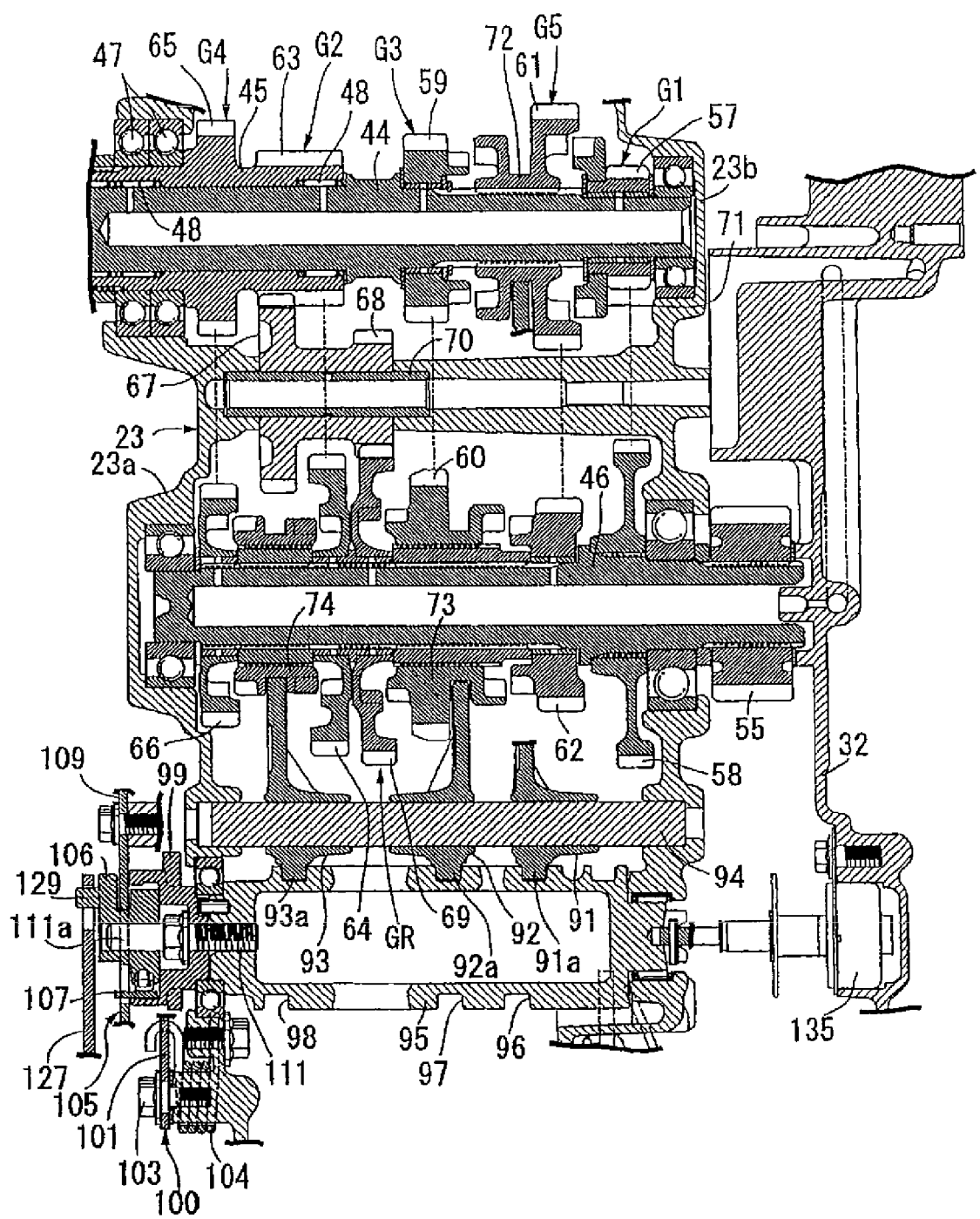
FIG. 3 is a cross-sectional view taken along line 3-3 of FIG. 2.

Referring additionally to FIGS. 2 and 3, first and second main shafts 44, 45 and a counter shaft 46 are journaled by the crankcase 23. The first and second main shafts 44, 45 are disposed coaxially with each other so as to enable relative rotation around one and the same axial line and to enable rotation around an axis parallel to the rotational axis of the crankshaft 22. The counter shaft 46 is parallel to the first and second main shafts 44, 45. Gear trains with a plurality of gear stages which can selectively be established are provided between the first and second main shafts 44, 45 and the counter shaft 46. In the embodiment, a first-speed gear train G1, a third-speed gear train G3 and a fifth-speed gear train G5 are provided between the first main shaft 44 and the counter shaft 46. A second-speed gear train G2, a fourth gear train G4 and a reverse gear train GR are provided between the second main shaft 45 and the counter shaft 46.

The first main shaft 44 coaxially passes through the second main shaft 45 for relative rotation which is journaled by the crankcase 23 via ball bearings 47, 47. A plurality of needle bearings 48 are interposed between the second main shaft 45 and the first main shaft 44.

A transmission cylindrical shaft 49 is relatively rotatably attached to the first main shaft 44 in the clutch housing chamber 33. Power is transmitted to the transmission cylindrical shaft 49 via the drive gear 39 attached to the crankshaft 22 for relative rotation, via a driven gear 50 meshing with the drive gear 39 and via a rubber damper 51. A first hydraulic clutch 52 is provided between the transmission cylindrical shaft 49 and the first main shaft 44 and a second hydraulic clutch 53 is provided between the transmission cylindrical shaft 49 and the second main shaft 45.

A dishlike clutch outer 52a provided for the first hydraulic clutch 52 is journaled by the transmission cylindrical shaft 49 for relative rotation. As shown in FIG. 2, the clutch outer 52a is provided on its inner circumference with a plurality of axially extending, engaging recess portions 75 which are equally spaced apart from each other in such a manner that a plurality of friction plates are engaged therewith so as not to be relatively rotatable. The clutch outer 52a is provided with oil drain holes 76 at a plurality of respective circumferential positions avoiding the engaging recess portions 75. Since the oil drain holes 76 are provided at the respective positions avoiding the engaging recess portions 75 as described above, it is possible to reduce the contact sound between the clutch outer 52a and the friction plates while leaving oil in the engaging recess portion 75 as much as possible. Also a clutch outer 53a provided for the second hydraulic clutch 53 are restricted similarly to the clutch outer 52a of the first hydraulic clutch 52.

In this way, when the first hydraulic clutch 52 is in a power transmission state and power is transmitted from the crankshaft 22 to the first main shaft 44, power is transmitted from the first main shaft 44 to the counter shaft 46 via a gear train alternatively established among the first, third and fifth-speed gear trains G1, G3 and G5. When the second hydraulic clutch 53 is in a power transmission state and power is transmitted from the crankshaft 22 to the second main shaft 45, power is transmitted from the second main shaft 45 to the counter shaft 46 via a gear train alternatively established among the second, fourth-speed and reverse gear trains G2, G4 and GR.

As shown in FIG. 1, the output shaft 54 connected to a drive wheel not shown and having an axis parallel to the rotational axis of the crankshaft 22 is rotatably journaled by the second crankcase cover 32 and by one case half body 23a of the crankcase 23. Both ends of the output shaft 54 liquid-tightly and rotatably pass through the first and second crankcase covers 31, 32, respectively, and project outward. On the other hand, a drive gear 55 is secured to the end of the counter shaft 46 projecting from the other case half body 23b of the crankcase 23. A driven gear 56 meshing with the drive gear 55 is carried by the output shaft 54. In short, the counter shaft 46 is connected to the drive wheel via the drive gear 55, via the driven gear 56 and via the output shaft 54.

Focusing on FIG. 3, the first-speed gear train G1 includes a first-speed drive idle gear 57 which is carried by the first main shaft for relative rotation with its axial position being constant; and a first-speed driven gear 58 which is joined to the counter shaft 46 so as not to be relatively rotatable and meshes with the first-speed drive idle gear 57. The third-speed gear train CA includes a third-speed drive idle gear 59 which is carried by the first main shaft 44 for relative rotation with its axial position being constant; and a third-speed driven gear 60 which is joined to the counter shaft 46 so as not to be relatively rotatable and meshes with third-speed drive idle gear 59. The fifth-speed gear train G5 includes a fifth-speed drive gear 61 which is disposed between the first and third drive idle gears 57 and 59 so as to enable axial slide operation and is joined to the first main shaft 44 so as not to be relatively rotatable; and a fifth-speed driven idle gear 62 which is carried by the counter shaft 46 for relative rotation with its axial position being constant and meshes with the fifth-speed drive gear 61.

The second-speed gear train G2 includes a second-speed drive gear 63 provided integrally with the second main shaft 45; and a second-speed driven idle gear 64 which is rotatably carried by the counter shaft 46 with its axial position being constant and meshes with the second-speed drive gear 63. The fourth-speed gear train G4 includes a fourth-speed drive gear 65 provided integrally with the second main shaft 45; and a fourth-speed driven gear 66 which is carried by the counter shaft 46 for relative rotation with its axial position being constant and meshes with the fourth-speed drive gear 65. The reverse-speed gear train GR includes a second-speed drive gear 63; a first reverse idle gear 67 meshing with the second-speed drive idle gear 63; a second reverse idle gear 68 formed integrally with the first reverse idle gear 67; and a reverse driven idle gear 69 which is carried by the counter shaft 46 for relative rotation with its axial position being constant and meshes with the second reverse idle gear 68. The first and second reverse idle gears 67, 68 formed integrally with each other are rotatably journaled by a reverse idle shaft 70 which has an axis parallel to each of the first main shaft 44, the second main shaft 45 and the counter shaft 46 and which is carried at both ends by the crankcase 23.

A ringlike to-be-engaged member 71 is secured to the end of the first-speed drive idle gear 57 close to the third-speed drive idle gear 59. A first shifter 72 is carried between the to-be-engaged member 71 and the third-speed drive idle gear 59 by the first main shaft 44 so as not to be relatively rotatable and to be axially slidable. The fifth-speed drive gear 61 is integrally provided on the first shifter 72. The first shifter 72 is slidable in the axial direction of the first main shaft 44 so as to select one of a position where it is engaged with the to-be-engaged member 71 to establish the first-speed gear train G1, a position where it is engaged with the third-speed drive idle gear 59 to establish the third-speed gear train G3, and an intermediate position where it is not engaged with any one of the first- and third-speed drive idle gears 57, 59 (the neutral state).

The third-speed driven gear 60 of the third-speed gear train G3 is integrally provided on a second shifter 73 which is carried between the fifth-speed driven idle gear 62 and the reverse driven idle gear 69 by the counter shaft 46 so as not to be relatively rotatable and to be axially slidable. The second shifter 73 is slidable in the axial direction of the counter shaft 46 between a position where it is engaged with the fifth-speed driven idle gear 62 and a position where it is engaged with the reverse driven idle gear 69 while maintaining the meshing state of the third-speed drive idle gear 59 with the third driven gear 60. Thus, if the second shifter 73 is engaged with the fifth-speed driven idle gear 62 with the first shifter 72 located at the intermediate position, the fifth-speed gear train 65 is established.

A third shifter 74 is carried between the second-speed driven idle gear 64 and the fourth-speed driven idle gear 66 by the counter shaft 46 so as not to be relatively rotatable and to be axially slidable. The third shifter 74 is slidable will the axial direction of the counter shaft 46 so as to select one of a position where it is engaged with the second-speed driven idle gear 64 to establish the second-speed gear train G2, a position where it is engaged with the fourth-speed driven idle gear 66 to establish the fourth-speed gear train 64 and an intermediate position where it is not engaged with any one of the second- and fourth-speed driven idle gears 64, 66 (the neutral state). Thus, if the second shifter 73 is engaged with the reverse driven idle gear 69 with the first and third shifters 72, 74 located at the intermediate position, the reverse gear train GR is established.

Figure 4:
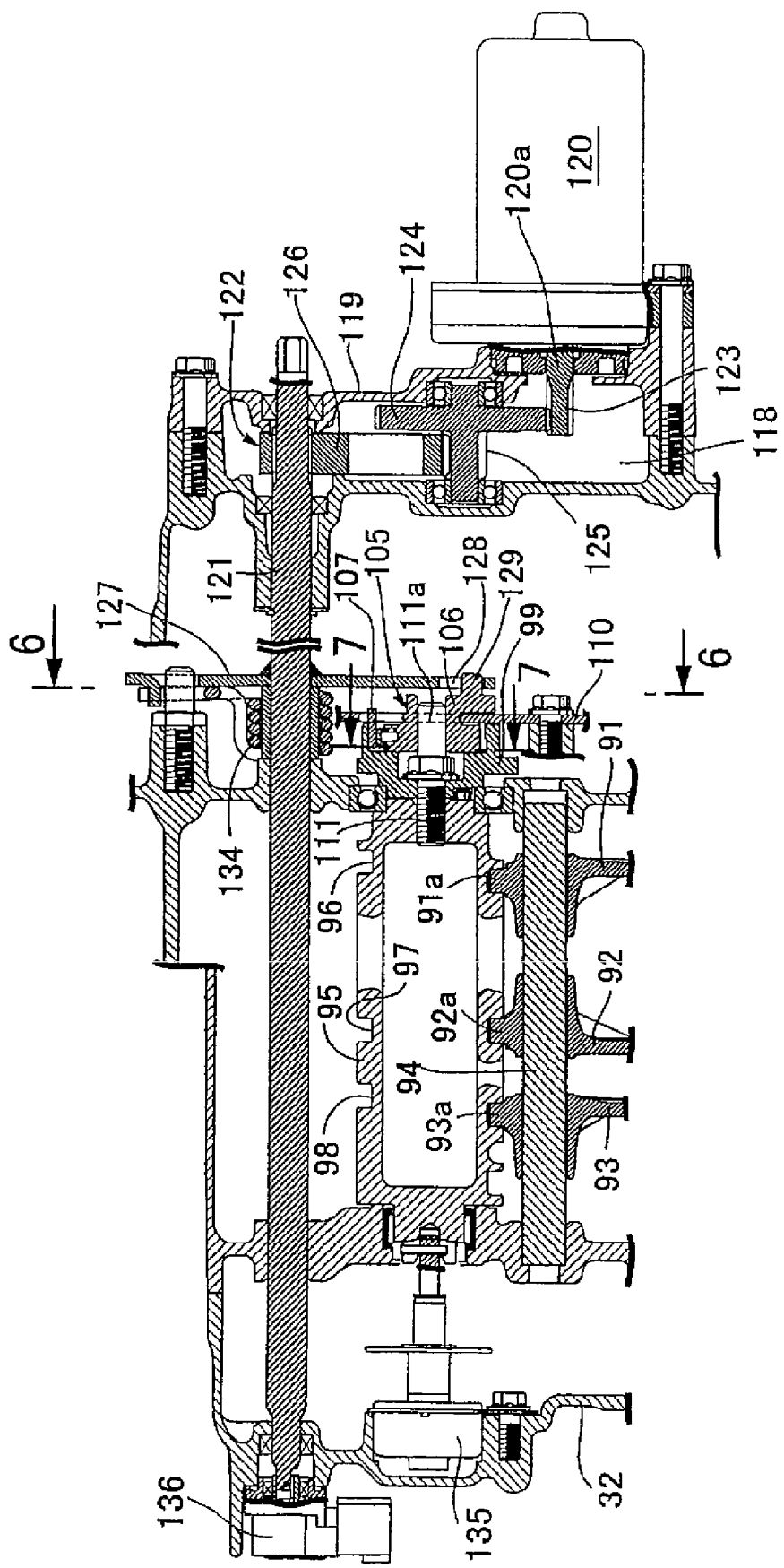
FIG. 4 is a cross-sectional view taken along line 4-4 of FIG. 2.

Referring additionally to FIG. 4, the first, second and third shifters 72, 73 and 74 are rotatably held by first, second and third shift forks 91, 92 and 93, respectively. The shift forks 91 to 93 have respective axial lines parallel to each of the first and second main shafts 44, 45 and the counter shaft 46 and are carried slidably in the axial direction of a shift fork shaft 94 by the shift fork shaft 94 supported by the crankcase 23. A shift drum 95 having an axis parallel to each of the first and second main shafts 44, 45 and the counter shaft 46 is carried by the crankcase 23 so as to be turnable around the axis. Shift pins 91a, 92a and 93a provided to project from the first, second and third shift forks 91, 92 and 93, respectively, are slidably engaged with first, second and third lead grooves 96, 97 and 98, respectively. If the shift drum 95 is turned, the first, second and third shift forks 91, 92 and 93 are axially and slidably moved according to the patterns of the first, second and third lead grooves 96, 97 and 98, respectively.

Figure 5:
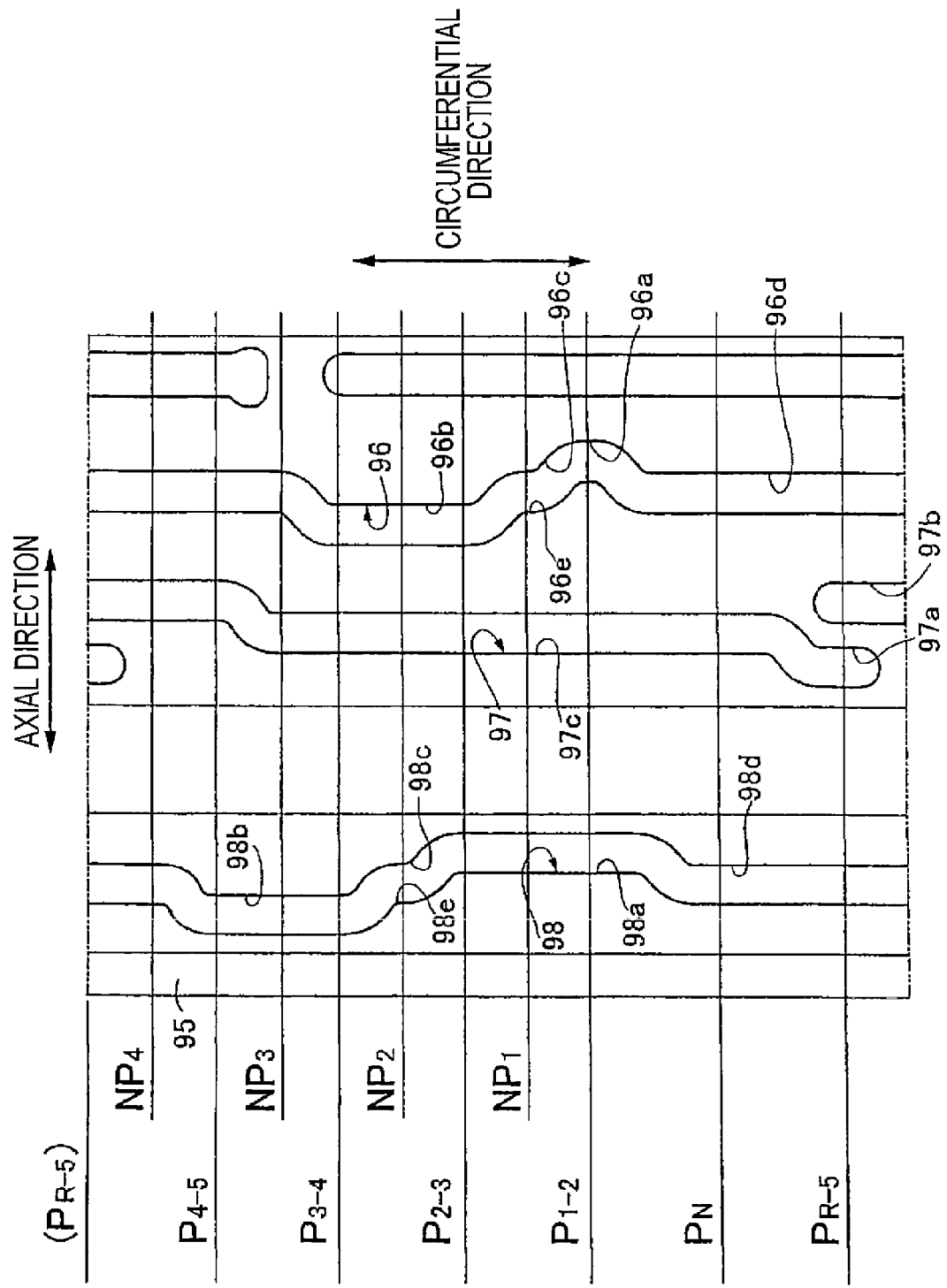
FIG. 5 is a development view of the outer circumferential surface of a shift drum.

Referring to FIG. 5, the first lead groove 96 is adapted to guide the slide operation of the first shift fork 91 holding the first shifter 72. The first lead groove 96 is provided along the entire circumference of the shift drum 95 to have a first-speed gear train establishing portion 96a, a third-speed gear train establishing portion 96b, a communication portion 96c and an intermediate-position portion 96d. The first-speed gear train establishing portion 96a extends in the circumferential direction of the shift drum 95 so as to bring the first shifter 72 into engagement with the to-be-engaged member 71 secured to the first-speed drive idle gear 57. The third-speed gear train establishing portion 96b extends in the circumferential direction of the shift drum 95 at a position offset from the first-speed gear train establishing portion 96a in the axial direction of the shift drum 95 so as to bring the first shifter 72 into engagement with the third-speed drive idle gear 59. The communication portion 96c connects the first- and third-speed gear train establishing portions 96a, 96b. The intermediate-position portion 96d is adapted to retain the first shifter 72 at the intermediate position. At the central portion of the communication portion 96c, the neutral portion 96e is formed to slightly extend in the circumferential direction of the shift drum 95 so as to retain the first shifter 72 at a position adapted to release engagement with each of the first- and third-speed driving idle gears 57, 59.

The second lead groove 97 is adapted to guide the slide operation of the second shift fork 92 holding the second shifter 73 and has a reverse gear train establishing portion 97a, a fifth-speed gear train establishing portion 97b and an intermediate-position portion 97c. The reverse gear train establishing portion 97a extends in the circumferential direction of the shift drum 95 so as to bring the second sifter 73 into the reverse driven idle gear 69. The fifth gear train establishing portion 97b extends in the circumferential direction of the shift drum 95 at a position offset from the reverse gear train establishing portion 97a in the axial direction of the shift drum 95 so as to bring the second shifter 73 into engagement with the fifth-speed driven idle gear 62. The intermediate-position portion 97c is adapted to retain the second shifter 73 at the intermediate position.

The second lead groove 97 is a particular lead groove of the present invention. This second lead groove 97 is provided on the outer circumference of the shift drum 95 so that it continuously extends beyond one circle of the shift drum 95 and both ends of the second lead groove 97 are out of alignment with each other in the axial direction of the shift drum 95. More specifically, the second lead groove 97 is formed such that the reverse gear train establishing portion 97a on the side of one end of the second lead groove 97 extending along the circumferential direction of the shift drum 95 and one portion of the fifth-speed gear train establishing portion 97b on the side of the other end of the second lead groove 97 are out of alignment with each other in the axial direction of the shift drum 95. In addition, the second lead groove 97 becomes the intermediate-position portion 97c which is offset from the reverse gear train establishing portion 97a as it goes from the one end of thereof to the other end. Further, the second lead groove 97 becomes the fifth-speed gear train establishing portion 97b offset from the intermediate-position portion 97c to one side of the shift drum 95 in the axial direction thereof. In this way, the second lead groove 97 is formed stepwise to be offset to one side of the shift drum 95 in the axial direction thereof.

The third lead groove 98 is adapted to guide the slide operation of the third shift fork 93 holding the third shifter 74. The third lead groove 98 is provided along the entire circumference of the shift drum 95 to have a second-speed gear train establishing portion 98a, a fourth-speed gear train establishing portion 98b, a communication portion 98c and an intermediate-position portion 98d. The second-speed gear train establishing portion 98a extends in the circumferential direction of the shift drum 95 so as to bring the third shifter 74 into engagement with the second-speed driven idle gear 64. The fourth-speed gear train establishing portion 98b extends in the circumferential direction of the shift drum 95 at a position offset from the second-speed gear train establishing portion 98a in the axial direction of the shift drum 95 so as to bring the third shifter 74 into the engagement with the fourth-speed drive idle gear 66. The communication portion 98c connects the second- and fourth-speed gear train establishing portions 98a, 98b. The intermediate-position portion 98d is adapted to retain the third shifter 74 at the intermediate position. At the central portion of the communication portion 98c, the neutral portion 98e is formed to slightly extend in the circumferential direction of the shift drum 95 so as to retain the third shifter 74 at a position adapted to release engagement with the second- and fourth-speed driving idle gears 64, 66.

Incidentally, a reverse and fifth-speed position $P_{R-5}$ which is a common shifting position, a neutral position $P_N$, a first- and second-speed position $P_{1-2}$, a second- and third-speed position $P_{2-3}$, a third- and fourth-speed position $P_{3-4}$, and a fourth- and fifth-speed position $P_{4-5}$ are sequentially set on the shift drum 95 so as to be spaced at intervals of 60 degrees.

In this way, at the reverse and fifth-speed position $P_{R-5}$, the reverse gear train GR and the fifth-speed gear train G5 which is the gear train for highest shift stage can be established. More specifically, it is possible to bring the shift pins 91a and 93a of the first and third shift forks 91 and 93 into engagement with the intermediate-position portions 96d and 98d of the first and third lead grooves 96 and 98, respectively. In addition, it is possible to bring the shift pin 92a of the second sift fork 92 into engagement with one the reverse gear train establishing portion 97a and fifth-speed gear train establishing portion 97b of the second lead groove 97. At the neutral position $P_N$, the respective shift pins 91a, 92a and 93a of the first, second and third shift forks 91, 92 and 93 are brought into engagement with the intermediate-position portions 96d, 97c and 98d of the first, second and third lead grooves 96, 97 and 98, respectively, thereby bringing any one of the gear trains G1 through G5 and GR into non-establishment. At the first- and second-speed position $P_{1-2}$, the shift pin 91a of the first shift fork 91 is brought into engagement with the first-speed gear train establishing portion 96a of the first lead groove 96, the shift pin 92a of the second shift fork 92 is brought into engagement with the intermediate-position portion 97c of the second lead groove 97 and the shift pin 93a of the third shift fork 93 is brought into engagement with the second-speed gear train establishing portion 98a of the third lead groove 98, thereby establishing both the first and second gear trains G1, G2.

At the seconds and third-speed position $P_{2-3}$, the shift pin 91a of the first shift fork 91 is brought into engagement with the third-speed gear train establishing portion 96b of the first lead groove 96, the shift pin 92a of the second shift fork 92 is brought into engagement with the intermediate-position portion 97c of the second lead groove 97 and the shift pin 93a of the third shift fork 93 is brought into engagement with the second-speed gear train establishing portion 98a of the third lead groove 98, thereby establishing both the second and third gear trains G2, G3.

At the third- and fourth-speed position $P_{3-4}$, the shift pin 91a of the first shift fork 91 is brought into engagement with the third-speed gear train establishing portion 96b of the first lead groove 96, the shift pin 92a of the second shift fork 92 is brought into engagement with the intermediate-position portion 97c of the second lead groove 97 and the shift pin 93a of the third shift fork 93 is brought into engagement with the fourth-speed gear train establishing portion 98b of the third lead groove 98, thereby establishing both the third and fourth gear trains G3, G4.

At the fourth- and fifth-speed position $P_{4-5}$, the shift pin 91a of the first shift fork 91 is brought into engagement with the intermediate-position portion 96d of the first lead groove 96, the shift pin 92a of the second shift fork 92 is brought into engagement with the fifth-speed gear train establishing portion 97b of the second lead groove 97 and the shift pit) 93a of the third shift fork 93 is brought into engagement with the fourth-speed gear train establishing portion 98b of the third lead groove 98, thereby establishing both the fourth and fifth gear trains G4, G5.

In short, at the time of upshift, a gear train with a higher-speed stage can preliminarily be established before switching to the higher-speed stage. At the time of downshift, a gear train with a lower-speed stage can preliminarily be established before switching to the lower-speed stage.

Incidentally, a first neutral position $NP_1$ is set at the central portion, along the circumferential direction of the shift drum 95, between the first- and second-speed position $P_{1-2}$ and the second- and third-speed position $P_{2-3}$ so as to temporarily retain the first shifter 72 at the neutral position in switching the establishing states of the first-speed gear train G1 and the third-speed gear train G3 provided between the first main shaft 44 and the counter shaft 46. The neutral portion 96e of the first groove 96 is disposed at the first neutral position $NP_1$.

A second neutral position $NP_2$ is set at the central portion, along the circumferential direction of the shift drum 95, between the second- and third-speed position $P_{2-3}$ and the third- and fourth-speed position $P_{3-4}$ so as to temporarily retain the third shifter 75 at the neutral position in switching the establishing states of the second-speed gear train G2 and the fourth-speed gear train G4 provided between the second main shaft 45 and the counter shaft 46. The neutral portion 98e of the third groove 98 is disposed at the second neutral position $NP_2$.

A third neutral position $NP_3$ is set at the central portion, along the circumferential direction of the shift drum 95, between the third- and fourth-speed position $P_{3-4}$ and the fourth- and fifth-speed position $P_{4-5}$ so as to retain the first shifter 72 at the neutral position in switching the establishing states of the third-speed gear train G3 and the fifth-speed gear train G5 provided between the first main shaft 44 and the counter shaft 46.

A fourth neutral position $NP_4$ is set between the fourth- and fifth-speed position $P_{4-5}$ and the reverse and fifth-speed position $P_{R-5}$ so as to retain the first and third shifters 72, 74 at the neutral position in switching the establishing states of the third-speed gear train G3 and the fifth-speed gear train G5.

Figure 6:
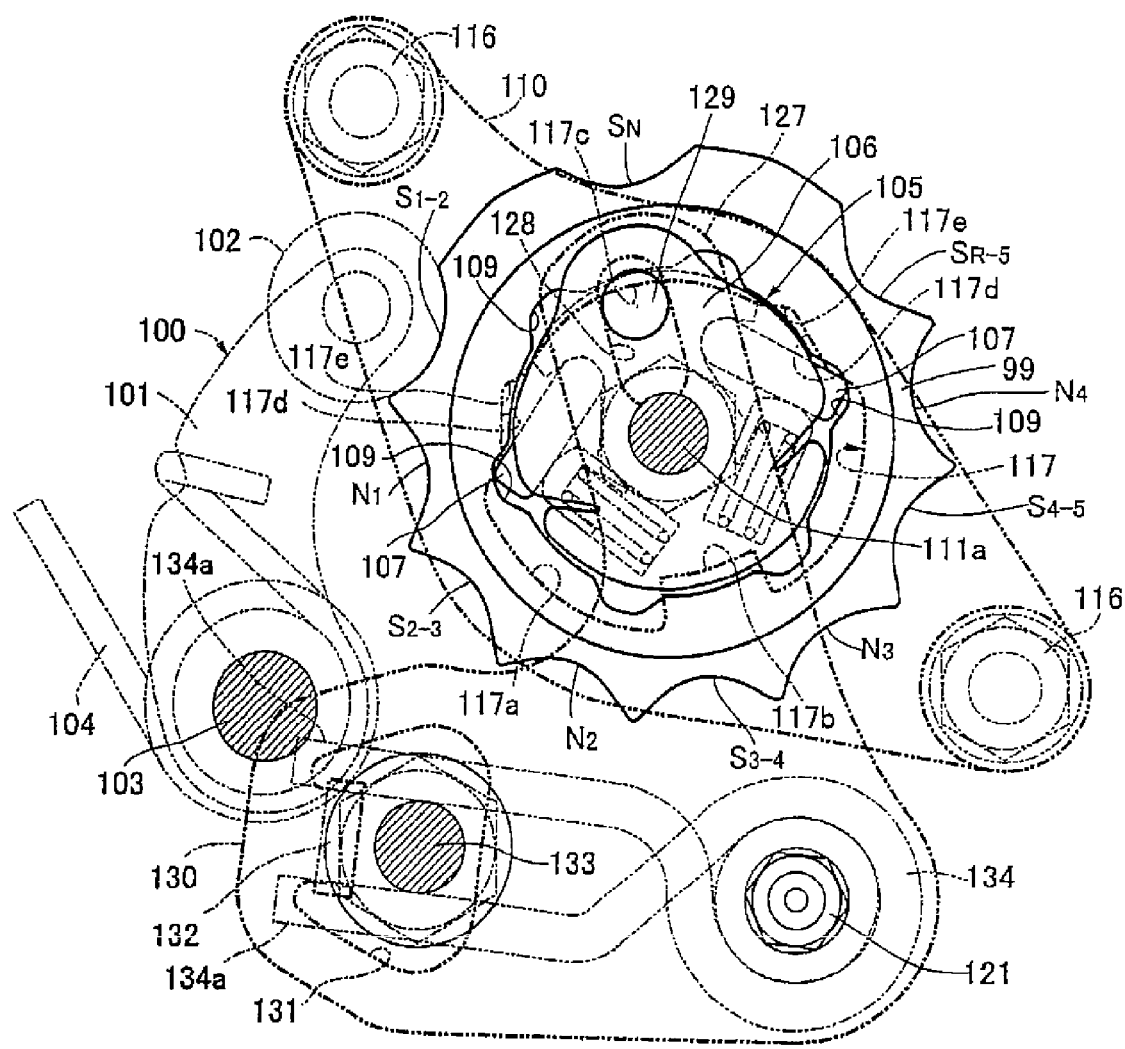
FIG. 6 is an enlarged cross-sectional view taken along line 6-6 of FIG. 4, in a first-speed driving state.
Figure 7:
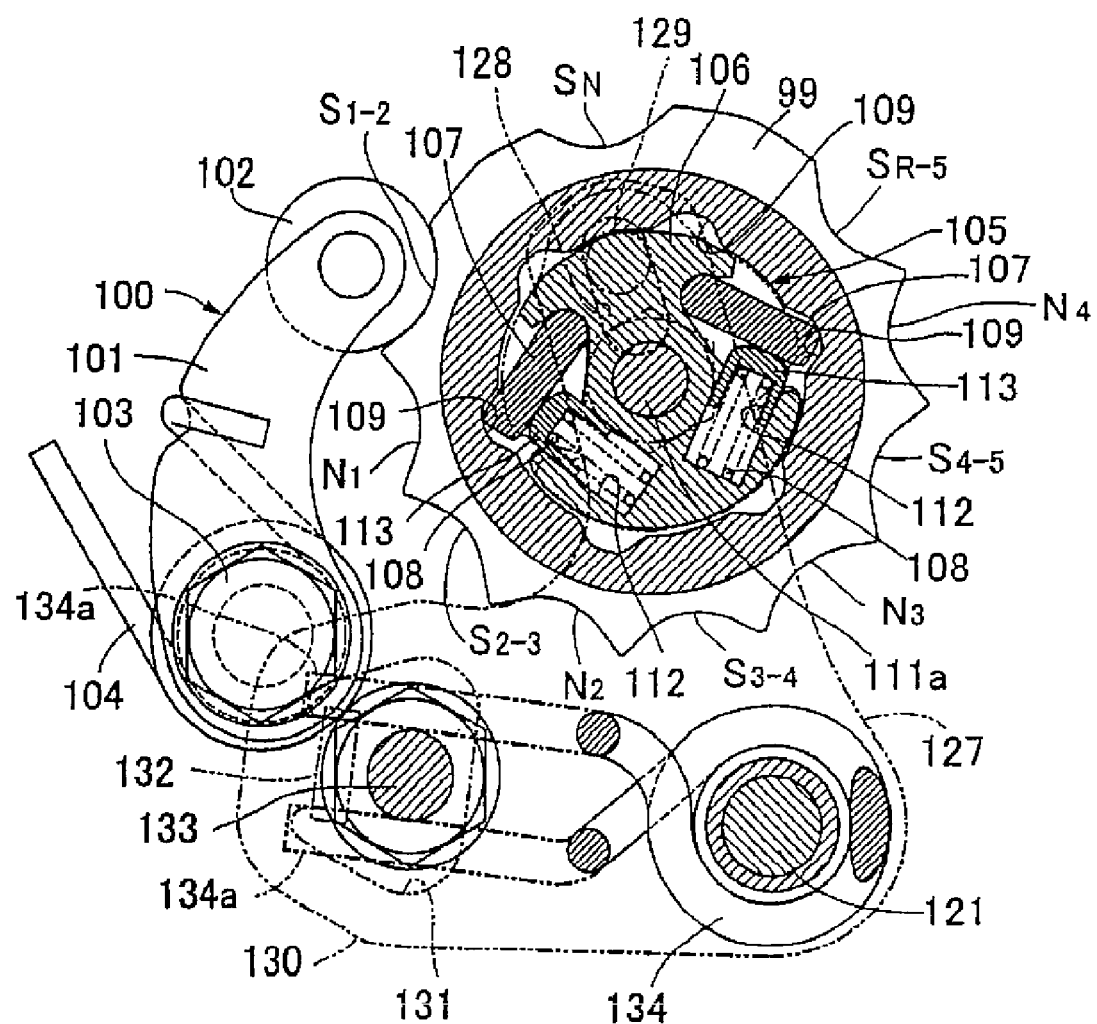
FIG. 7 is an enlarged cross-sectional view taken along line 7-7 of FIG. 4, in the first-speed driving state.

Referring additionally to FIGS. 6 and 7, a shift drum center 99 turning together with the shift drum 95 is secured to one end of the shift drum 95 with a bolt 111 coaxial therewith. The shift drum center 99 is formed on its outer circumference with a reverse and fifth-speed positioning notch $S_{R-5}$, a neutral positioning notch $S_N$, a first- and second-speed positioning notch $S_{1-2}$, a second- and third-speed positioning notch $S_{2-3}$, a third- and fourth-speed positioning notch $S_{3-4}$, a fourth- and fifth-speed positioning notch $S_{4-5}$ corresponding respectively to the reverse and fifth-speed position $P_{R-5}$, the neutral position $P_N$, the first- and second speed position $P_{1-2}$, the second- and third-speed position $P_{2-3}$, the third- and fourth-speed position $P_{3-4}$, the fourth- and fifth-speed position $P_{4-5}$ which are set on the shift drum 95 to selectively establish the first-through fifth-speed gear trains G1 through G5 and reverse gear trains GR.

In the embodiment, the notches $S_{R-5}$, $S_N$, $S_{1-2}$, $S_{2-3}$, $S_{3-4}$, $S_{4-5}$ are provided on the outer circumference of the shift drum center 99 so as to be spaced apart from each other at intervals of 60 degrees.

In addition, neutral notches $N_1$, $N_2$, $N_3$ and $N_4$ corresponding respectively to the first- through fourth-speed positions $N_{P1}$, $N_{P2}$, $N_{P3}$ and $N_{P4}$ are formed on the outer circumference of the shift drum center 99 at respective central positions between the first- and second-speed positioning notch $S_{1-2}$ and the second- and third-speed positioning notch $S_{2-3}$, between the second- and third-speed positioning notch $S_{2-3}$ and the third- and fourth-speed positioning notch $S_{3-4}$, between the third- and fourth-speed positioning notch $S_{3-4}$ and the fourth- and fifth-speed positioning notch $S_{4-5}$, and between the fourth- and fifth-speed positioning notch $S_{4-5}$ and the reverse and fifth-speed positioning notch $S_{R-5}$.

A drum stopper arm 100 is selectively engaged with each of the notches $S_{R-5}$, $S_N$, $S_{1-2}$, $S_{2-3}$, $S_{3-4}$, $S_{4-5}$, $N_1$, $N_2$, $N_3$, and $N_4$ provided on the shift drum center 99. The drum stopper arm 100 includes an arm 101 and a roller 102. The arm 111 is pivotally supported at its proximal end by the case half body 23a of the crankcase 23 by use of a support shaft 103 having an axis parallel to the respective axes of the shift drum 95 and the shift drum center 99. The roller 102 is rotatably supported by the end of the arm 101 so as to be engaged with each of the notches $S_{R-5}$, $S_N$, $S_{1-2}$, $S_{2-3}$, $S_{3-4}$, $S_{4-5}$, $N_1$, $N_2$, $N_3$, and $N_4$. In addition, the notches $S_{R-5}$, $S_N$, $S_{1-2}$, $S_{2-3}$, $S_{3-4}$, $S_{4-5}$, $N_1$, $N_2$, $N_3$, and $N_4$ are formed in an arcuate concave to stabilize the engaging state of the roller 102.

A torsion spring 104 is provided between the proximal end of the arm 101 and the case half body 23a. The arm 101, i.e., the drum stopper arm 100 is biased toward the turning center of the shift drum center 99 by a spring force exerted by the torsion spring 104 to bring the roller 102 into engagement with one of the notches $S_{R-5}$, $S_N$, $S_{1-2}$, $S_{2-3}$, $S_{3-4}$, $S_{4-5}$, $N_1$, $N_2$, $N_3$, and $N_4$.

The shift drum center 99 is intermittently turned and driven by a predetermined angle (60 degrees in the embodiment) by drive means 105. The drive means 105 includes a drum shifter 106, a pair of poles 107, 107, a pair of springs 108, 108, engaging recess portions 109, 109, a stationary guide plate 110 and a shift operation motor 120. The drum shifter 106 has at least one portion disposed in the shift drum center 99 so as to enable turning around its axis coaxial with the shift drum center 99. The poles 107, 107 are symmetrically attached to the drum shifter 106 so as to rise and fall in the radial direction of the drum shifter 106. The springs 108, 108 bias the respective polls 107 in the rising direction. The engaging recess portions 109 are provided in the inner circumference of the shift drum center 99 at circumferentially equal intervals so as to en-able engagement with the associated poles 107. The guide plate 110 guides the rising or falling state of the poles 107 according to the turning of the drum shifter 106. The shift operation motor 120 applies a turning force to the drum shifter 106.

The drum shifter 106 is supported by a shaft portion 111a so as to be turnable around its axis coaxial with the shift drum center 99. The shaft portion 111a is part of and coaxial with the bolt 111 coaxially connected to one end of the shift drum 95. The drum shifter 106 has a part protruding outwardly from the shift drum center 99 and the most part disposed within the shift drum center 99 for relative rotation.

Each of the springs 108 is compressedly provided between the closed end of a housing recess portion 112 provided on the outer circumferential portion of the drum shifter 106 and a bottomed cylindrical lifter 113 which is slidably fitted into the housing recess portion 112 so as to be abutted against the leading end of the pole 107. Thus, the poles 107 are each biased by the spring 108 in a rising direction. When the pole 107 rises, its leading end projects from the outer circumference of the drum shifter 106. When the pole 107 falls, the leading end positionally, approximately coincides with the outer circumference of the drum shifter 106.

The shift drum center 99 is provided on its inner circumference with the plurality of (six in the embodiment) engaging recess portions 109 at circumferentially equal intervals. While the drum stopper arm 100 is engaged with one of the reverse and fifth-speed positioning notch $S_{R-5}$, the neutral positioning notch $S_N$, the first- and second-speed positioning notch $S_{1-2}$, the second- and third-speed positioning notch $S_{2-3}$, the third- and fourth-speed positioning notch $S_{3-4}$, and the fourth- and fifth-speed positioning notch $S_{4-5}$, the leading ends of the poles 107 can selectively be engaged with two engaging recess portions 109, 109 located to put two other engaging recess portions 109, 109, therebetween, of the engaging recess portions 109.

The guide plate 110 is fastened to the case half body 23a with a pair of bolts 116, 116 at a position where the shift drum center 99 is put between the case half boy 23a of the crankcase 23 and the guide plate 110. The guide plate 110 is provided with a guide hole 117 corresponding to the drum shifter 106.

The guide hole 117 includes a large-diameter circular arc portion 117a, a restrictive projection 117b, a small-diameter circular arc portion 117c and connecting portions 117d, 111d. The large-diameter circular arc portion 117a is formed to extend around the turning axes of the shift drum center 99 and drum shifter 106, i.e., the axis of the shaft portion 117a and to have a diameter greater than the outer circumference of the drum shifter 106. The restrictive projection 117b projects inward of the outer circumference of the drum shifter 106 from the central portion of the large-diameter circular arc portion 117a. The small-diameter circular arc portion 117c is formed to extend around the axis of the shaft portion 117a and have a diameter smaller than the outer circumference of the drum shifter 106. One of the connecting portions 117d, 117d connects one end of the large-diameter circular arc portion 117a with one end of the small-diameter circular arc portion 117c and the other connects the other end of the large-diameter circular are portion 117a with the other end of the small-diameter circular arc portion 117c. The circumferential length of the large diameter circular arc portion 117a is set to a length corresponding to that between the two engaging recess portions 109 engaged respectively with the leading ends of both the poles 107.

The connecting portions 117d are each formed at its central portion with a step portion 117e. The step portion 117e is abutted against the pole 107 to push it to the falling side when the pole 107 engaged with the engaging recess portion 109 is moved toward the small-diameter circular arc portion 117c in response to the turning of the drum shifter 106. The step portions 117e are disposed outward of the inner circumference of the shift drum center 99.

The restrictive projection 117b is formed to be abutted against the leading end of one of the poles 107 to restrict the turning of the drum shifter 106 in response to one operation of the drum shifter 106 which is temporarily stopped during the operation, according to the operation of the shift operation motor 120 which is temporarily sopped during the operation.

Focusing on FIG. 4, a cover 119 is fastened to the first crankcase cover 31 so as to form a reduction gear housing chamber 118 therebetween. The shift operation motor 120 is mounted to the cover 119. The shift operation motor 120 has a rotational axis parallel to the shift drum 95. The shift operation motor 120 is mounted to the cover 119 in such a manner that its output shaft 120a projects into the reduction gear mechanism housing chamber 118. On the other hand, a change shaft 121 having an axis parallel to the shift drum 95 is disposed to turnably pass through the first crankcase cover 31, through the cover 119 and through the second crankcase cover 32. A reduction gear mechanism 122 is housed in the reduction gear mechanism housing chamber 118 so as to be disposed between the output shaft 120a and the change shaft 121.

The reduction gear mechanism 122 includes a drive gear 123 provided in the reduction gear mechanism housing chamber 118 integrally with the output shaft 120a of the shift operation motor 120; a first intermediate gear 124 meshing with the drive gear 123; a second intermediate gear 125 rotating integrally with the first intermediate gear 124; and a driven sector gear 126 secured to one end of the change shaft 121 in the reduction gear mechanism housing chamber 118 and meshing with the second intermediate gear 125. The rotational power of the shift operation motor 120 is reduced in speed by the reduction gear mechanism 122 and transmitted to the change shaft 121.

A change arm 127 is secured at its proximal end to the change shaft 121 so as to extend in the radial direction of the change shaft 121 toward the drum shifter 106. The change arm 127 lengthwise extending in the radial direction of the change shaft 121 is provided with a long-hole-like engaging hole 128. An engaging pin 129 which is implanted in the drum shifter 106 at a position offset from the rotational axis of the drum shifter 106 is engaged with the engaging hole 128.

An arm 130 extending in the radial direction of the change shaft 121 is provided integrally with the proximal end of the change arm 127 so as to form an approximately L-shape along with the change arm 127. The arm 130 is formed at its leading end with an arcuate long-hole 131 around the axis of the change shaft 121. In addition, a projecting portion 132 is provided to be located on a straight line connecting the circumferential center of the long-hole 131 with the axis of the change shaft 121.

On the other hand, a pin 133 is implanted in the case half body 23a of the crankcase 23 so as to be inserted into the long-hole 131. A griping spring 134 is disposed between the change arm 127 and arm 130, and the case half body 23a of the crankcase 23 so as to surround the change shaft 121. The griping spring 134 has at both ends a pair of gripping arms 134a, 134a gripping the projecting portion 132 and the pin 133 from both sides. Thus, the change arm 127 and the arm 130 is biased to a neutral position where the projecting portion 132 and the pin 133 are lined with each other on the straight line connecting the circumferential center of the long-hole 131 and with the axis of the change shaft 121.

Now, a description is made of a case of upshift to the second-speed from the driving state at the first-speed, namely, from the case where the drum stopper arm 100 is engaged with the first- and second-speed positioning notch $S_{1-2}$ of the shift drum center 99, the first hydraulic clutch 52 is engaged and the second hydraulic clutch 53 is disengaged. The change shaft 121 and change arm 127 are turned clockwise in FIG. 6 in response to the operation of the shift electric motor 120. Since the engaging pin 129 is engaged with the long-hole 128 of the change arm 127, the drum shifter 106 of the drive means 105 is turned clockwise in FIG. 6 while the engaging pin 129 is displaced in the engaging hole 128 toward the change shaft 121.

Thus, one of the poles 107, 107 engaged respectively with the two engaging recess portions 109, 109 is turned around the axis of the shaft portion 111 along a portion, of the guide hole 117 of the guide plate 110, corresponding to the large-diameter circular arc portion 117a, thereby pressing and turning the shift drum center 99 clockwise in FIG. 6.

Figure 8:
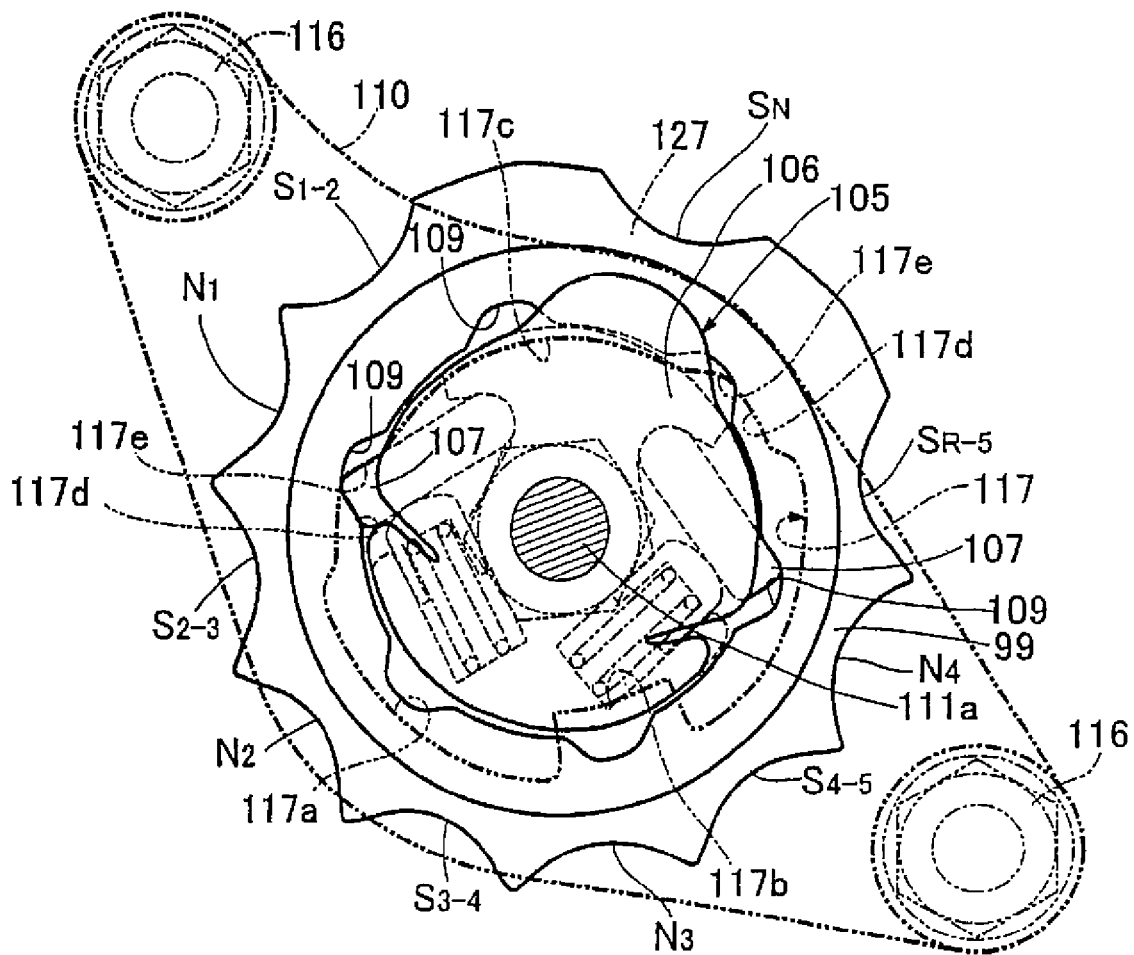
FIG. 8 illustrates a state of a portion of drive means encountered in the middle of the turning of a shift drum center.

When drivingly turned in this way, the shift drum 95 may precedently be turned in some cases. In this case, as shown in FIG. 8, the gear trains G1 through G5, GR are in a non-establishment state, the other of the poles 107, 107 (one of them which does not press the shift drum center 99) is abutted against the step portion 117e at the intermediate portion of the connecting portion 117d of the guide hole 117 to bring the other pole 107 into abutment against and into engagement with the engaging recess portion 109. This will stop the precedent turn of the shift drum 95.

Figure 9:
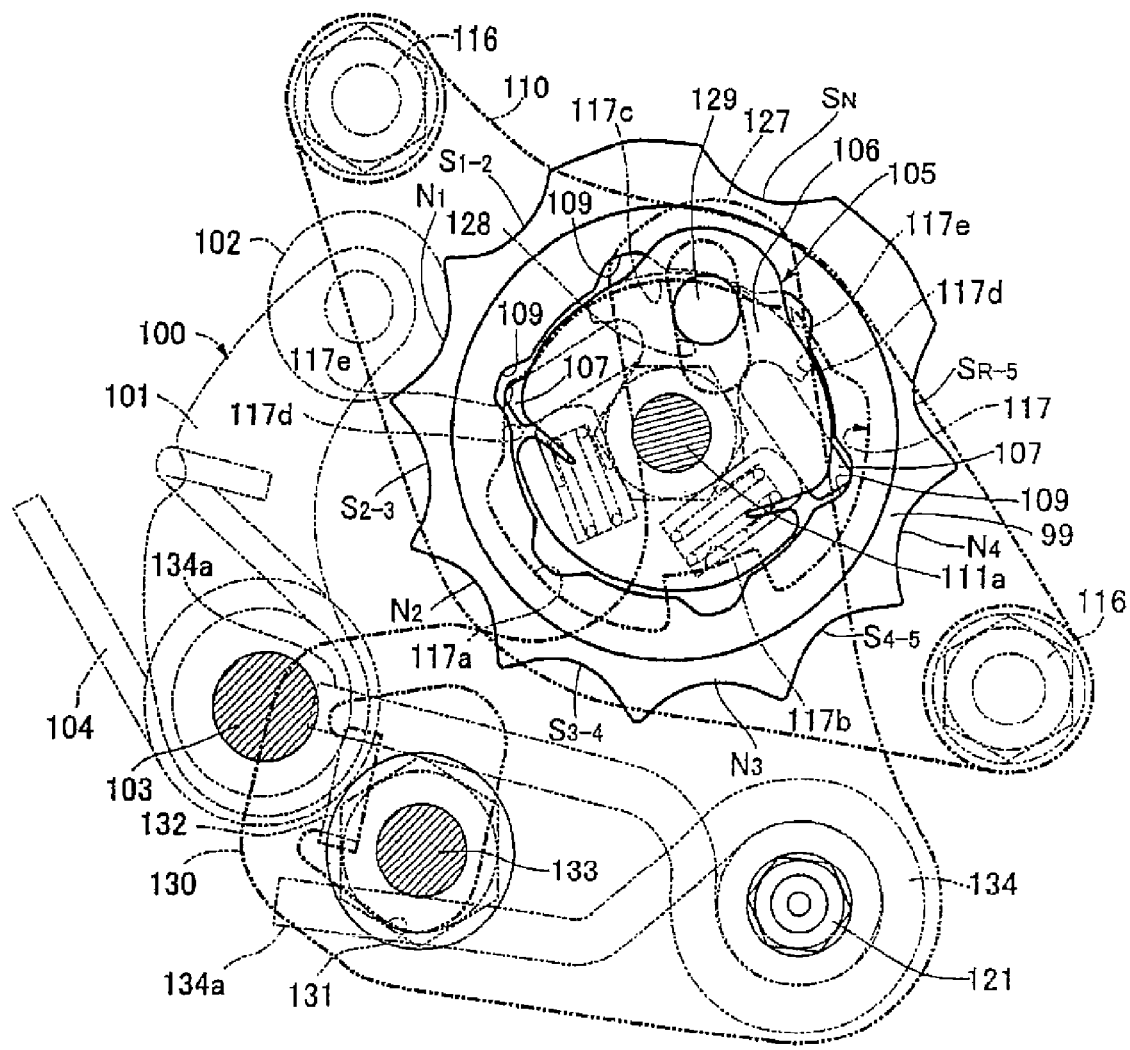
FIG. 9 is an enlarged cross-sectional view, corresponding to FIG. 6, illustrating a state of the middle of upshift front the first-speed to the second-speed.

In this state, as shown in FIG. 9, the roller 102 of the drum stopper arm 100 gets over the mountain between the first- and second-speed positioning notch $S_{1-2}$ and the neutral notch $N_1$ and engages the neutral notch $N_1$, whereby the neutral position of the shift drum 95 can accurately be provided. If the drum shifter 106 is further turned, the other pole 107 is turned so as to be inwardly folded by the step portion 117e, whereby the roller 102 of the drum stopper arm 100 gets over the mountain between the neutral notch $N_1$ and the second- and third-speed notch $S_{2-3}$.

Figure 10:
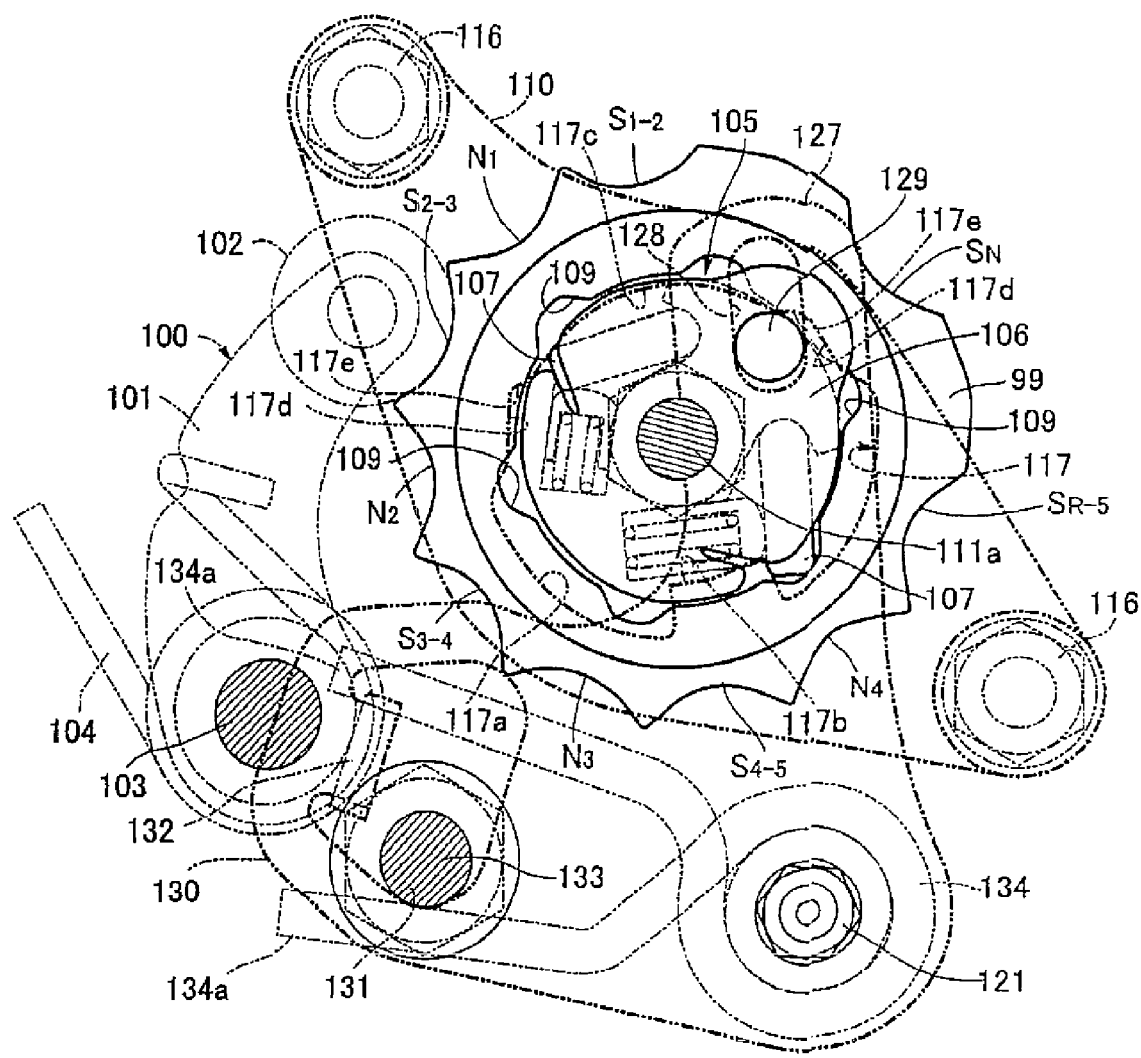
FIG. 10 is an enlarged cross-sectional view, corresponding to FIG. 6, in the second-speed driving state.

The further turn of the drum shifter 106 allows the leading end of the other pole 107 to come into slidable contact with the small-diameter circular arc portion 117c of the guide hole 117 of the guide plate 110. When the drum shifter 106 is turned until the roller 102 gets over the mountain between the neutral notch $N_1$ and the second- and third-speed notch $S_{2-3}$, the operation of the shift electric motor 120 is stopped. As shown in FIG. 10, the shift drum center 99 is turned until the roller 102 of the drum stopper arm 100 is engaged with the second- and third-speed notch $S_{2-3}$. In other words, the shift electric motor 120 is only needed to provide power to turn the drum shifter 106 by less than 60 degrees, e.g., 53.7 degrees, which corresponds to an interval between the first- and second-speed positioning notch $S_{1-2}$ and the second- and third-speed positioning notch $S_{2-3}$.

As described above, the drive means 105 temporarily moderately lowers the rotational speed of the shift drum 95 in the middle of the upshift from the first-speed to the second-speed. Such operation of the drive means 105 applies to upshift from the second-speed to the third-speed, to upshift from the third-speed to the fourth-speed, to upshift from the four-speed to the fifth-speed, to downshift from the fifth-speed to the fourth-speed, to downshift from the fourth-speed to the third-speed, to downshift from the third-speed to the second-speed and to downshift from the second-speed to the first-speed.

In addition, the roller 102 of the drum stopper arm 100 is engaged with the reverse and fifth-speed positioning notch $S_{R-5}$, with the neutral positioning notch $S_N$, with the first- and second-speed positioning notch $S_{1-2}$, with the second- and third-speed positioning notch $S_{2-3}$, with the third- and fourth-speed positioning notch $S_{3-4}$, and with the fourth- and fifth-speed positioning notch $S_{4-5}$, the turning of the shift drum 95 is stopped. Thereafter, the change arm 127 is returned to the position shown in FIGS. 6 and 7 by the spring force of the gripping spring 134 and also the drum shifter 106 is returned to the position shown in FIGS. 6 and 7.

The turning angle of the shift drum 95 is detected by a turning angle detector 135, which is connected to the other end of the shift drum 95 and mounted to the second crankcase cover 32. The turning angle of the change shaft 121 is detected by a change shaft turning angle detector 136, which is connected to the other end of the change shaft 121 and mounted to the second crankcase cover 32.

Figure 11:
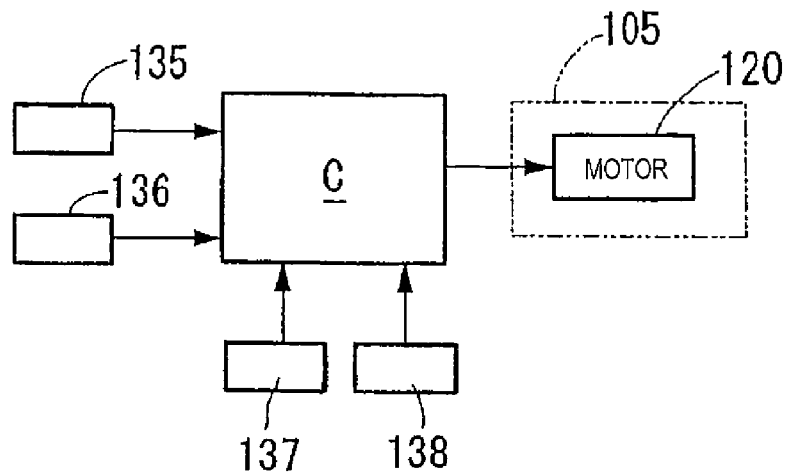
FIG. 11 is a block diagram illustrating a configuration of a control system.

Referring to FIG. 11, the shift operation motor 120 of the drive means 105 is controlled by a control unit C in response to the detected values of the turning angle detector 135 and change shaft turning angle detector 136 and to the signals from an engine start switch 137 and from a brake switch 138.

Figure 12:
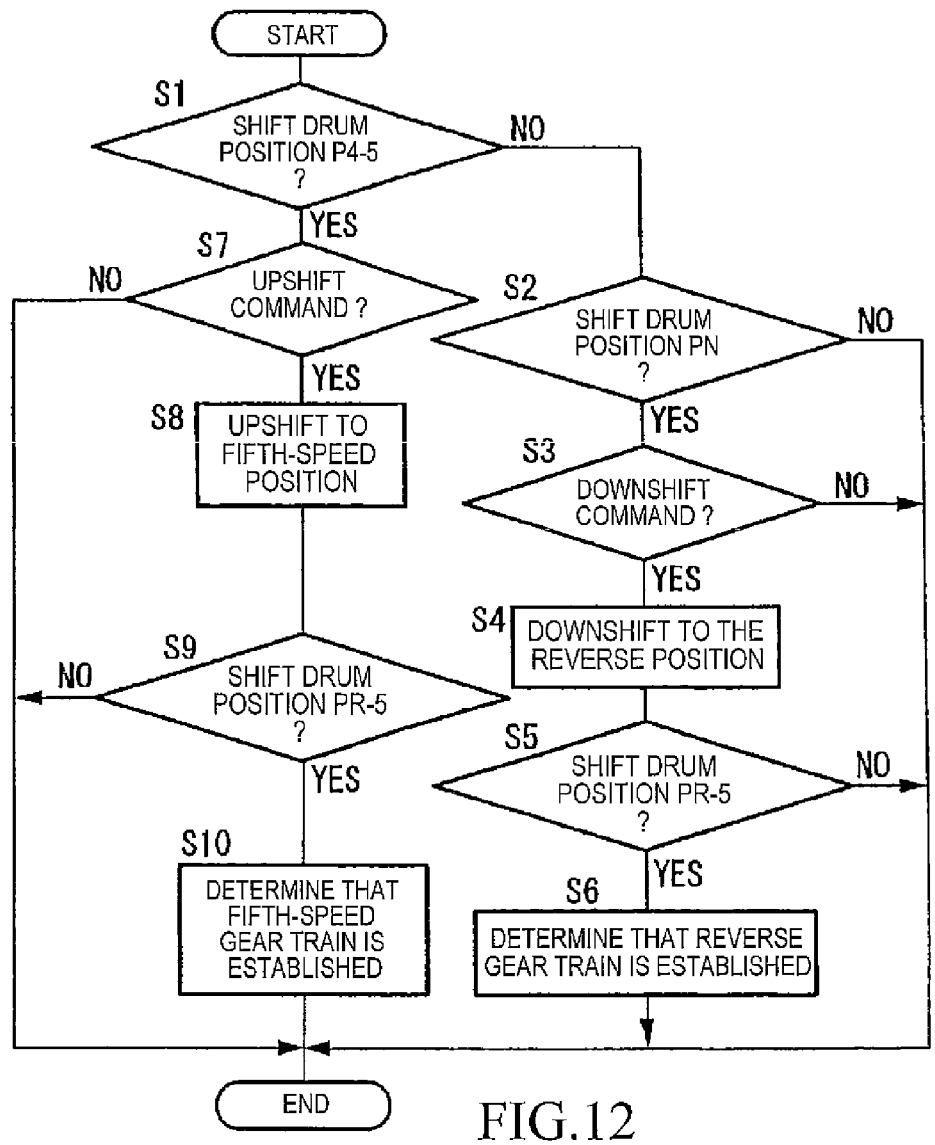
FIG. 12 is a flowchart illustrating a processing procedure for determining whether any one of two gear trains which can be established at a common shift position of the shift drum is in an established state.

In addition, the control unit C determines, according to the procedure shown in FIG. 12, which one of the reverse gear train GR and the fifth-speed gear train G5 is established in the state where the shift drum 95 is at the reverse and fifth-speed position $P_{R-5}$ which is the common shift position during the operation of the engine E.

In step S1 in FIG. 12, it is determined whether or not the current turning angle of the shift drum 95 is an angle corresponding to the fourth- and fifth-speed position $P_{4-5}$. If it is not the angle corresponding to the fourth- and fifth-speed position $P_{4-5}$, it is determined whether or not the turning angle of the shift drum 95 is an angle corresponding to the neutral position $P_N$ in step S2. If it is confirmed that a downshift command is issued in the state where the turning angle of the shift drum 95 is the angle corresponding to the neutral position $P_N$ in step S3, the shift drum 95 is turned to downshift to the reverse position in step S4. Thereafter in step S5, if it is confirmed that the shift drum 95 is at the reverse and fifth-speed position $P_{R-5}$, it is determined that the reverse gear train GR is established and a flag is set which indicates that reverse gear train GR is established.

In step S1, if it is determined that the current turning angle of the shift drum 95 is an angle corresponding to the fourth- and fifth-speed position $P_{4-5}$, it is confirmed that the upshift command is issued in such a state in step S7. If the upshift command is issued, the shift drum 95 is turned to upshift to the fifth-speed in step S8. Thereafter, if it is confirmed that the shift drum 95 is at the reverse and fifth-speed position $P_{R-5}$ in step S9, it is determined that the fifth-speed gear train G5 is established in step S10 and a flag is set which indicates that the fifth-speed gear train G5 is established.

In other words, during the operation of the engine E, the control unit C determines that the reverse gear train GR is established when the shift drum 95 is turned to the downshift side from a shift position adjacent, from the upshift side, to the reverse and fifth-speed position $P_{R-5}$, i.e., from the neutral position $P_N$. In addition, the control unit C determines that the fifth-speed gear train G5 is established when the shift drum 95 is turned to the upshift side from a shift position adjacent, from the upshift side, to the reverse and fifth-speed position $P_{R-5}$, i.e., from the fourth- and fifth-speed position $P_{4-5}$.

Figure 13:
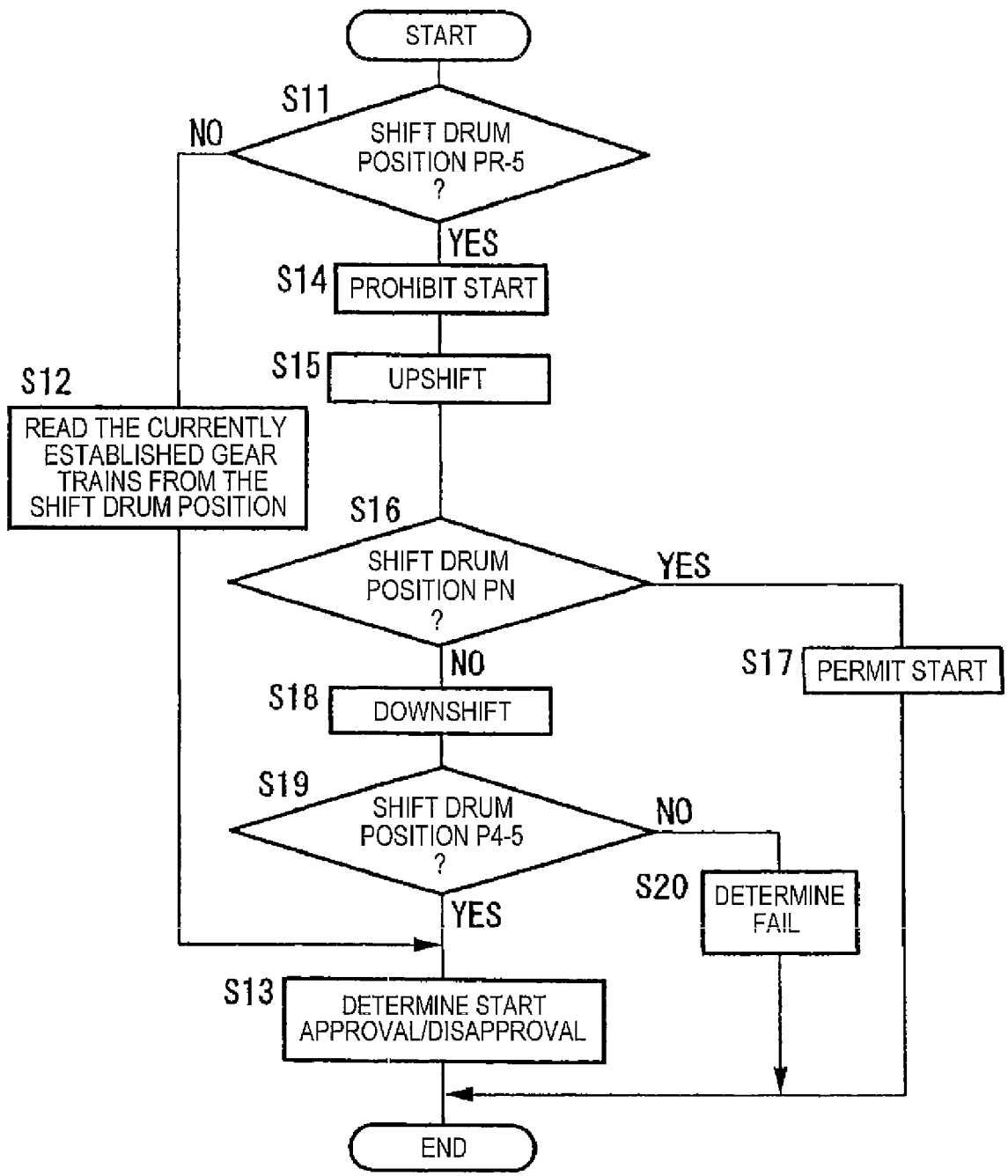
FIG. 13 is a flowchart illustrating a processing procedure for start approval/disapproval determination at the time of starting the engine.

The control unit C judges approval/disapproval of start at the time of ignition and start of the engine E according to the procedure shown in FIG. 13. In step 11, it is determined whether or not the current turning angle of the shift drum 95 is an angle corresponding to the reverse and fifth-speed position $P_{R-5}$. If it is not the angle corresponding to the reverse and fifth-speed position $P_{R-5}$, the procedure proceeds to step S12, in which the control unit C reads the currently established gear train from the current turning angle of the shift drum 95. Further, in step S13, approval/disapproval of start is determined at the currently established gear train. When this start approval/disapproval determination is made, start of the engine E is permitted if the control unit C receives a signal, from the brake switch 138, indicating that the braking operation has been performed with any one of the gear trains established for example.

In step S11, if it is confirmed that the current turning angle of the shift drum 95 is the angle corresponding to the reverse and fifth-speed position $P_{R-5}$, the start of the engine E is prohibited in step S14 and a command is issued for turning the shift drum 95 to the upshift side by one stage in step S15. If it is confirmed that the turning angle of the shift drum 95 is an angle corresponding to the neutral position $P_N$ in step S16, the start of the engine E is permitted in step S17.

In step S16, if it is not confirmed that the current turning angle of the shift drum 95 is the angle corresponding to the reverse and fifth-speed position $P_{R-5}$, a command is issued for turning the shift drum 95 to the downshift side by one stage in step S18. If it is confirmed that the shift drum 95 is at the fourth- and fifth-speed position $P_{4-5}$, the procedure proceeds to step S13, in which approval/disapproval of start is determined. If it is not confirmed that the shift drum 95 is at the fourth- and fifth-speed position $P_{4-5}$ in step S19, the procedure proceeds to step S20, in which it is determined that a fail state arises.

That is to say, the control unit C performs a first step, in determining start approval/disapproval of the engine E, of prohibiting the start of the engine E if the shift drum 95 is at the common shift position; a second step of operating the drive means 105 so that the shift drum 95 may be turned to the upshift side by one stage; and a third step of determining whether or not the shift drum 95 has been turned to the neutral position $P_N$ adjacent, from the upshift side, to the common shift position in the upshift process of the second step.

The control unit C also performs a fourth step of permitting the start of the engine E if it has been determined in the third step that the shift drum was turned to the neutral position $P_N$ in the upshift process of the second step; a fifth step of operating the drive means 105 so that the shift drum 95 may be turned to the downshift side when it has been determined in the third step that the shift drum was not turned to the neutral position $P_N$ in the upshift process of the second step; a sixth step of determining whether or not the shift drum 95 is turned to the shift position (the fourth- and fifth speed position $P_{4-5}$) adjacent, from the downshift side, to the common shift position in the downshift position process of the fifth step; a seventh step of determining that the gear train corresponding to the shift position adjacent, from the downshift side, to the common shift position among the gear trains G1 through G5, GR with a plurality of shift stages, i.e., the fourth- and fifth speed gear trains G, G5 are established when it is confirmed that the shift drum 95 has been turned to the shift position adjacent, from the downshift side, to the common shift position in the sixth step; and an eighth step of determining that a fail state arises when it is confirmed that the shift drum 95 has not been turned to the fourth- and fifth-speed position $P_{4-5}$ in the sixth step.

In addition, upon receipt of an engine start signal from the engine start switch 137 after the process of the start approval/disapproval determination described above, the control unit C starts the engine E while the shift drum 95 is at the neutral position $P_N$. The control unit C starts the engine E only during receipt of the brake operation signal from the brake switch 138 while at least one of the gear trains CG through G5, GR with the plurality of shift stages is established.

Figure 14:
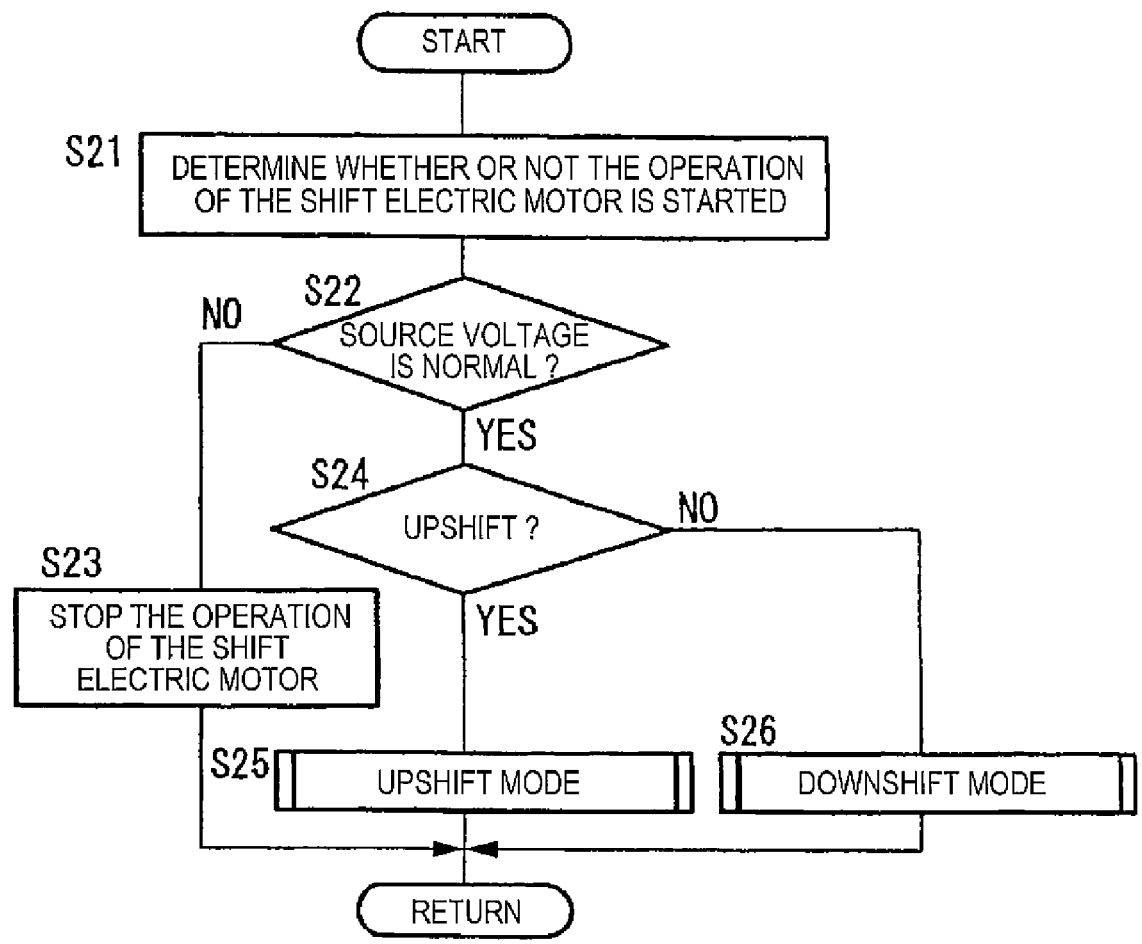
FIG. 14 is a flowchart illustrating a control procedure for a shift operation motor.

The operation of the shift operation motor 120 is performed according to the procedure shown in FIG. 14. In step 21, it is determined whether or not the shift operation motor 120 is started and the turning angle of the change shaft 121 is initially corrected to "0". Next in step S22, it is determined whether or not source voltage, i.e., the output voltage of the battery is in a normal state exceeding a desired value. If it is determined that the source voltage is insufficient, the procedure proceeds to step S23, in which the operation of the shift operation motor 120 is stopped. If it is determined that the source voltage is normal, the procedure proceeds from step S22 to step S24, in which it is determined whether or not upshift is to be done. If the upshift is to be done, the process of the upshift mode is performed in step S25. If the upshift is not to be done, the process of the downshift mode is performed in step S26.

Figure 15:
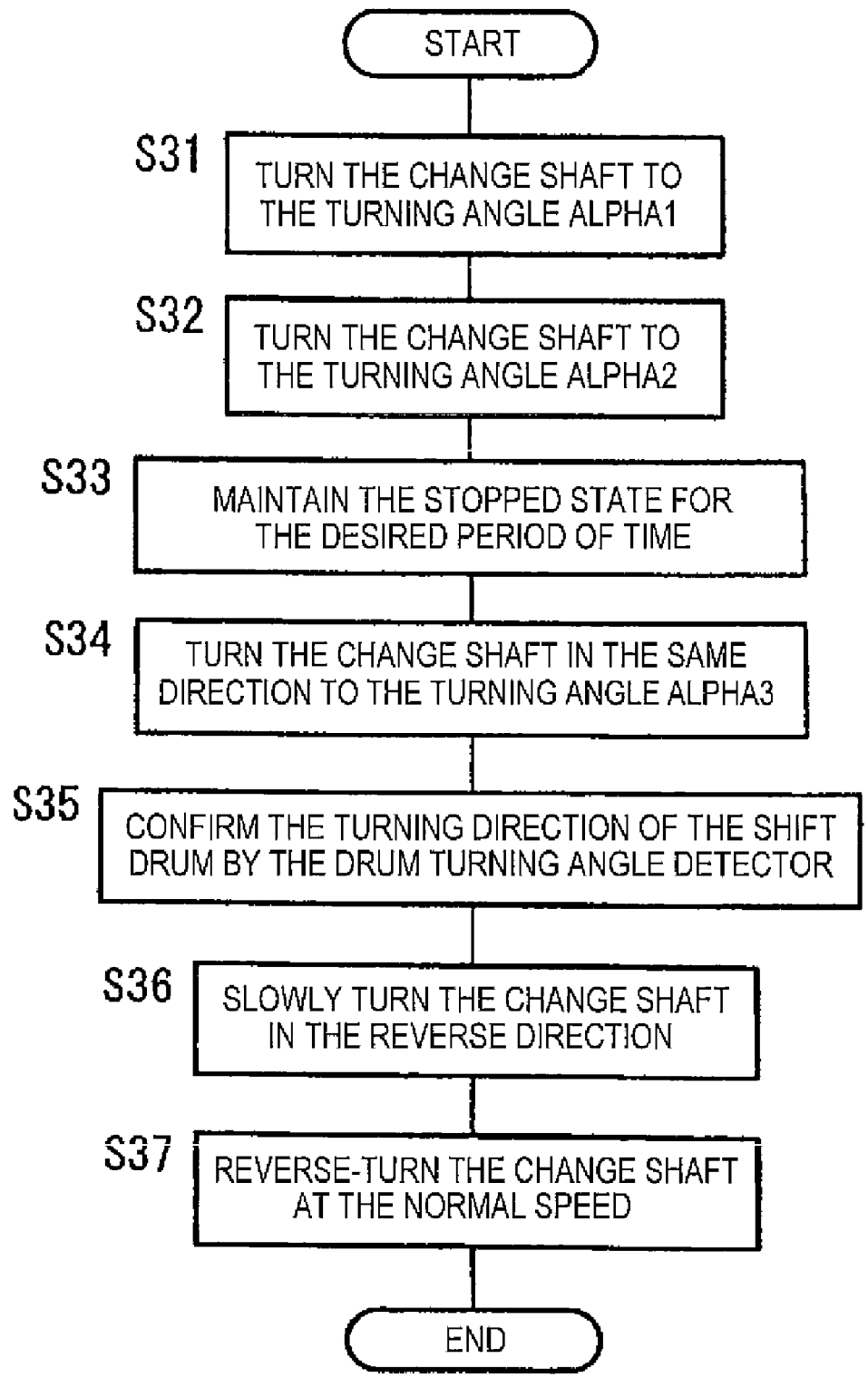
FIG. 15 is a flowchart illustrating a control procedure in an upshift mode.
Figure 16:
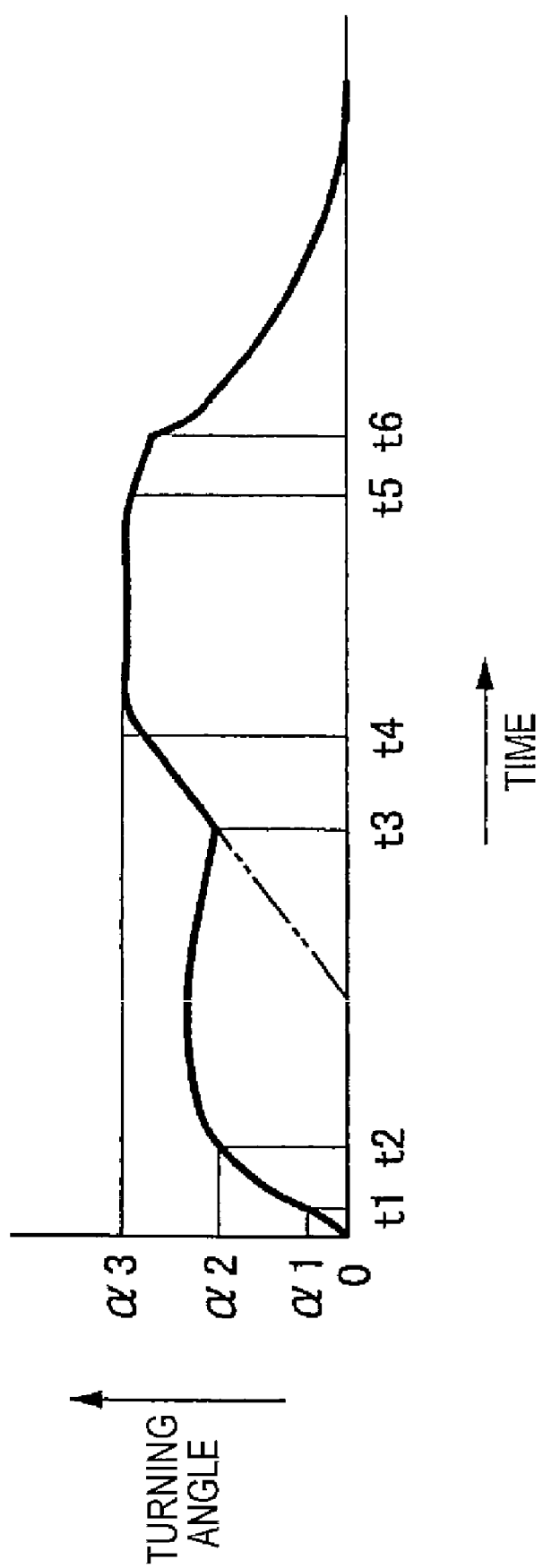
FIG. 16 illustrates turning angle changes of a change shaft during upshift.

In the upshift mode the process shown in FIG. 15 is performed to change the turning angle of the change shaft 121 as shown in FIG. 16. In step S31, the shift operation motor 120 is operated to turn the change shaft 121 so that the turning angle of change shaft 121 detected by the change shaft turning angle detector 136 may become α1. The process of step S31 is performed to confirm the turning direction and required time of the change shaft 121. When it is determined that the turning angle of the change shaft 121 reaches the turning angle α1 at time t1, the procedure proceeds to step S32.

In step S32, the shift operation motor 120 is operated to turn the change shaft 121 so that the turning angle of the change shaft 121 detected by the change shaft turning angle detector 136 reaches α2. This turning angle α2 is set to approximate half of the turning angle (60 degrees in the embodiment) needed to sequentially turn the shift drum 95 to each of the reverse and fifth-speed position $P_{R-5}$, the neutral position $P_N$, the first- and second speed position $P_{1-2}$, the second- and third-speed position $P_{2-3}$, the third- and fourth-speed position $P_{3-4}$, and the fourth- and fifth-speed position $P_{4-5}$. In this embodiment, the turning angle α2 is approximate 30 degrees. The operation of the shifter by the turning of the change shaft 121 to the turning angle α2 brings the gear train that has been established until then into a non-established state, i.e., into the neutral state.

At time t2 when the turning angle of the change shaft 121 reaches α2, the procedure proceeds to step S33, in which the operation of the shift operation motor 120 is temporarily stopped and the stopped state is maintained until time t3 for the desired period of time ΔT.

At time t3, in step S34, the shift operation motor 120 is turned in the same direction as that for each of the turning angles α1, α2 to be reached until the change angle reaches the turning angle α3. This turning angle α3 is an turning angle needed to sequentially turn the shift drum 95 to each of the reverse and fifth-speed position $P_{R-5}$, the neutral position $P_N$, the first- and second speed position $P_{1-2}$, the second- and third-speed position $P_{2-3}$, the third- and fourth-speed position $P_{3-4}$, and the fourth- and fifth-speed position $P_{4-5}$. In this embodiment, the turning angle α3 is 60 degrees. The turning of the change shaft 121 to the turning angle α3 brings the gear train to be established into an established state. In this case, the leading end of one of the poles 107 is abutted against the restrictive projection 117b to restrict the turning of the drum shifter 106.

At time t4, in step S35 after the change shaft 121 has been turned to the turning angle α3, the turning angle detector 135 confirms whether or not the shift drum 95 is at the desired turning position. At the t5, the procedure proceeds to step S36, in which the change shaft 121 is slowly turned in the reverse direction. This process is performed to prevent the release of the selective engagement of the drum stopper arm 100 with the notches $S_{2-3}$, $S_{3-4}$, $S_{4-5}$ of the shift drum center 99. At time t6, in step S37, the shift operation motor 120 is operated to turn the change shaft 121 in the reverse direction at the normal speed until it is returned to "0" degree.

Incidentally, the turning angle is linearly changed during upshift and downshift at the time of start as indicated with a chain line of FIG. 16.

Now, a description is made of the following case. In the state of drive at the second-speed, specifically, in the state where the drum stopper arm 100 is brought into engagement with the first- and second-speed positioning notch $S_{1-2}$ of the shift drum center 99, the second hydraulic clutch 53 is engaged and the first hydraulic clutch 52 is disengaged, when upshift is performed to the third-speed, the drum stopper arm 100 is brought into engagement with the second- and third-speed positioning notch $S_{2-3}$ of the shift drum center 99 by preliminary shift. The change shaft 121 and change arm 127 are turned clockwise in FIG. 6 in response to the operation of the shift operation motor 120. In addition, the drum shifter 106 of the drive means 105 is turned clockwise in FIG. 6 while the engaging pin 129 is displaced in the engaging hole 128 toward the change shaft 121 because the engaging pin 129 is engaged with the long-hole 128 of the change arm 127.

In this way, one of the poles 107, 107 engaged with the two respective engaging recess portions 109, 109 is turned around the axis of the shaft portion 110a along the portion corresponding to the large-diameter circular arc portion 117a of the glide hole 117 of the guide plate 110, thereby pressing and turning the shift drum center 99 clockwise in FIG. 6. Thus, the shift drum center 99, i.e., the shift drum 95 is turned at approximate 30 degrees to allow the roller 102 of the drum stopper drum 100 to get over the mountain between the first- and second-speed positioning notch $S_{1-2}$ and the neutral notch $N_1$ and engage the neutral notch $N_1$. In this state, the operation of the shift operation motor 120 is temporarily stopped and the stopped state is maintained for the desired period of time ΔT.

After a lapse of the desired period of time ΔT, the operation of the shift operation motor 120 is resumed. The drum shifter 106 is turned until the roller 102 of the drum stopper arm 100 is engaged with the second- and third-speed positioning notch $S_{2-3}$. In this state, the second hydraulic clutch 53 is engaged, thereby completing the upshift to the third-speed. When the operation of the shift operation motor 120 is stopped, the change arm 127 is returned by the spring force of the griping arm 134 to the position shown in FIGS. 6 and 7 and also the drum shifter 106 is returned to the position shown in FIGS. 6 and 7.

In other words, the drive means 105 having the shift operation motor 120 turns the shift drum center 99 from the state where the drum stopper arm 100 is engaged with the first- and second-speed positioning notch $S_{1-2}$ to the state where it is engaged with the second- and third-speed notch $S_{2-3}$. At this time, the turning of the shift drum center 99 is temporarily stopped in the middle of the turning to temporarily maintain the state where the drum stopper arm 100 is engaged with the neutral notch $N_1$ and the neutral state of the first shifter 72 is temporarily maintained.

In this way, when the drum stopper arm 100 is brought into engagement with the second- and third-speed positioning notch $S_{2-3}$ of the shift drum center 99 by the preliminary shift which is upshift from the first-speed to the third-speed during the second-speed travel, the drive means 105 preliminary stops the turning speed of the shift operation motor-shift drum 95. The operation of the drive means 105 holds true for the preliminary shift which is upshift from the third-speed to the fifth-speed or from the second-speed to the fourth-speed.

At the time of preliminary shift, which is downshift from the four-speed to the second-speed, from the fifth-speed to the third-speed or from the third-speed to the first speed, the downshift mode of step S26 in FIG. 14 is performed. In this downshift mode, the shift operation motor 120 is turned in the direction reverse to that in the upshift mode to perform the same process as that of the upshift.

A description is next made of the operation of the embodiment. The first shifter 72 turning together with the first main shaft 44 is slid to the side to release the engagement with one of the first-speed drive idle gear 57 and third-speed drive idle gear 59 located on both sides of the first shifter 72 and engage the other and the third sifter 74 turning together with the counter shaft 46 is slid to the side to release the engagement with one of the second-speed driven idle gear 64 and four-speed driven idle gear 66 located on both sides of the third shifter 74 and engage the other. At this time, the first and third shift forks 91, 93 are guided by the neutral portions 96e, 98e, respectively, which are formed, so as to extend in the circumferential direction of the shift drum 95, at the respective central portions of the respective communication portions 96c, 98c of the first and third lead grooves 96, 98 provided on the outer circumference of the shift drum 95. Thus, it is possible to delay the engaging timing of the first and third shifters 72, 74 with the other of the first-speed drive idle gear 57 and third-speed drive idle gear 59, and of the second-speed driven idle gear 64 and fourth-speed driven idle gear 66 with respect to the turning of the shift drum 95, as compared with a shift drum having linear communication portions.

In addition, when the first, second and third shifters 72, 73, 74 are slid to switch the established states of the gear trains G1 through G5, GR, the drive means 105 turns the shift drum center 99 by the desired angle to bring the turning of the shift drum center 99 into the speed-reduced state or into the temporarily stopped state, in the neutral state of the shifters 72, 73, 74 in the middle of sliding the shifters 72, 73, 74. The turning of the shift drum 95, namely, the sliding operation of the first, second and third shifters 72, 73, 74 is temporarily stopped, coming into the neutral state, in the middle of establishing a gear train.

Further, the plurality of positioning notches $S_{1-2}$, $S_{2-3}$, $S_{3-4}$ and $S_{4-5}$ are formed on the outer circumference of the shift drum center 99 so as to be spaced at equal intervals and is selectively engaged with the drum stopper arm 100 to establish a gear train selected among the gear trains G1 through G5. In addition, the neutral notches $N_1$, $N_2$, $N_3$ are provided on the outer circumference of the shift drum center 99 to be disposed at the central portion between the positioning notches $S_{1-2}$ and $S_{2-3}$, between positioning notches $S_{2-3}$ and $S_{3-4}$, and between the positioning notches $S_{3-4}$ and $S_{4-5}$, respectively. Since turning resistance acting on the drum shifter 106 from the drum stopper arm 100 temporarily increases in the middle of the establishment of the gear train, the timing speed of the shift drum 95, that is, the sliding speed of each of the first, second and third shifters 72, 73, 74 is temporarily reduced.

Speed differences between the first shifter 72 and the gear adapted to bring the first shifter 72 into engagement and between the third shifter 74 and the gear adapted to bring the third shifter 74 into engagement are relatively reduced along with the functions of the neutral portions 96e, 98c which are respectively formed at the central portions of the communication portions 96c, 98c of the lead grooves 96, 98. This more effectively prevents the engagement sound from being increased.

The first shifter 72 turning with the first main shaft 44 is slid to the side to release the engagement with one of the first-speed drive idle gear 57 and third-speed drive idle gear 59 located on both sides of the first shifter 72 and engage the other in the state where power transmission from the engine E to the first main shaft 44 is interrupted and the power from the engine E is transmitted to the second main shaft 45. At this time, the first shift fork 91 is guided by the neutral portion 96f which is formed at the central portion of the connection portion 96c of the first lead groove 96 provided on the outer circumference of the shift drum 95 so as to extend in the circumferential direction of the shift drum 95. Thus, the engaging timing of the first shifter 72 with both the idle gears 57, 59 can be delayed with respect to the turning of the shift drum 95. The turning of the shift drum center 99 is temporarily stopped by the temporary stop in the middle of the transfer operation to the desired angle by the drive means 105, by the temporarily stop of the turning of the shift drum 95 in the middle thereof by the guide plate 110 bringing the pole 107 into engagement with the engaging recess portion 109, and by the engagement of the drum stopper arm 100 with the neutral notch $N_1$ on the outer circumference of the shift drum 99. Thus, in the state where both the idle gears 57, 59 are turned by the establishment of the second-speed gear train G2 provided between the second main shaft 45 and the counter shaft 46, a relative rotational speed difference can relatively be reduced between the idle gears 57, 59 and the first shifter 72 resulting from the turning of the first main shaft 44 dragged by the viscosity of the lubricating oil filled between the needle bearings 48 provided between the first and second main shafts 44, 45 or by the viscosity of the lubricating oil between the first hydraulic clutch 52 and the transmission cylindrical shaft 49. This can prevent increased engagement sound.

The third shifter 74 turning along with the counter shaft 46 is slid to the side to release the engagement with one of the second-speed driven idle gear 64 and fourth-speed driven idle gear 66 located on both sides of the third shifter 74 and engage the other in the state where power transmission from the engine E to the second main shaft 45 is interrupted and the power from the engine E is transmitted to the first main shaft 44. At this time, the third shift fork 93 is guided by the neutral portion 98f which is formed at the central portion of the connection portion 98c of the third lead groove 98 provided on the outer circumference of the shift drum 95 so as to extend in the circumferential direction of the shift drum 95. Thus, the engaging timing of the third shifter 74 with the idle gears 64, 66 can be delayed with respect to the turning of the shift drum 95. The turning of the shift drum center 99 is temporarily stopped in the middle thereof by the temporary stop of the transfer operation to the desired angle by the drive means 105 in the middle thereof, by the turning resistance by the guide plate 110 and by the engagement of the drum stopper arm 100 with the neutral notch $N_2$ formed on the outer circumference of the shift drum center 99.

Thus, in the state where the counter shaft 46 and the third shifter 74 are turned by the establishment of the third-speed gear train G3 provided between the first main shaft 44 and the counter shaft 46, a relative rotational speed difference can relatively be reduced between the third shifter 74 and the idle gears 64, 66 resulting from the turning of the second main shaft 45 dragged by the viscosity of the lubricating oil filled between the needle bearings 48 provided between the first and second main shafts 44, 45 or by the viscosity of the lubricating oil between the second hydraulic clutch 53 and the transmission cylindrical shaft 49. This can prevent increased engagement sound.

The second lead groove 97 that is at least one particular lead groove among the lead grooves 96, 97, 98 provided on the outer circumference of the shift drum 95 continuously extends beyond one circle of the shift drum 95. Both ends of the second lead groove 97 are provided on the outer circumference of the shift drum 95 so as to be out of alignment with each other in the axial direction of the shift drum 95. The reverse and fifth-speed position $P_{R-5}$ which is a common shift position adapted to establish the gear trains GR and G5 with the two different shift stages, with the rear shift stage and fifth-speed stage in this embodiment, is set at one position corresponding to both the ends of the second lead groove 97 along the circumferential direction of the shift drum 95. Thus, the number of the shift positions set on the shift drum 95 can be increased while the enlargement of the transmission resulting from the increased diameter of the shift drum 95 is avoided and an increase in design manhours is avoided by eliminating the significant modification of the shape of the lead grooves 96, 97, 98.

In addition, the second lead groove 97 is formed to be stepwise offset to one side of the shift drum 95 in the axial direction thereof as it goes from the one end of thereof to the other end. Thus, while both the ends of the second lead groove 97 are arranged to be offset from each other in the axial direction of the shift drum 95, the axial enlargement of the shift drum 95 can be prevented without an influence on the operation of the shift fork 92.

The control unit C which controls the operation of the drive means 105 in response to the turning angle detection of the turning angle detector 135 which detects the turning angle of the shift drum 95 determines, during the operation of the engine E, that the reverse gear train GR is established when the shift drum 95 is turned from the shift position (the neutral position $P_N$) adjacent, from the upshift side, to the reverse and fifth-speed position $P_{R-5}$ to the downshift side. In addition, the control unit C determine that the fifth-speed gear train 65 is established when the shift drum 95 is turned from the shift position (the fourth- and fifth-speed position $P_{4-5}$) adjacent, from the downshift side, to the reverse and fifth-speed position $P_{R-5}$ to the upshift side. Although the reverse gear train GR and the fifth-speed gear train G5 for fifth-speed shift stage or highest shift stage are designed to be established at one and the same position in the circumferential direction of the shift drum 95, it is reliably determined by the single turning angle detector 135 which one of the shift stage using the reverse gear train GR and the highest shift stage is produced.

At the time of starting the engine E, the control unit C determines the approval/disapproval of engine start when it is determined that the shift drum 95 is at the common shift position on the basis of the detection result of the turning angle detector 135; therefore, the control unit C can reliably confirms the sift position even if the shift drum 95 is at the common shift position.

The control unit C performs a first step, in determining start approval/disapproval of the engine E, of prohibiting the start of the engine E if the shift drum 95 is at the common shift position; a second step of operating the drive means 105 so that the shift drum 95 may be turned to the upshift side by one stage; and a third step of determining whether or not the shift drum 95 has been turned to the neutral position $P_N$ adjacent, from the upshift side, to the common shift position in the upshift process of the second step.

The control unit C also performs a fourth step of permitting the start of the engine E if it has been determined in the third step that the shift drum 95 was turned to the neutral position $P_N$ in the upshift process of the second step; a fifth step of operating the drive means 105 so that the shift drum 95 may be turned to the downshift side when it has been determined in the third step that the shift drum was not turned to the neutral position $P_N$ in the upshift process of the second step; a sixth step of determining whether or not the shift drum 95 is turned to the shift position (the fourth- and fifth speed position $P_{4-5}$) adjacent, from the downshift side, to the common shift position in the downshift position process of the fifth step; a seventh step of determining that the gear train corresponding to the shift position adjacent, from the downshift side, to the common shift position among the gear trains G1 through G5, GR with a plurality of shift stages, i.e., the fourth- and fifth speed gear trains G4, G5 are established when it is confirmed that the shift drum 95 has been turned to the shift position adjacent, from the downshift side, to the common shift position in the sixth step; and an eighth step of determining that a fail state arises when it is confirmed that the shift drum 95 has not been turned to the fourth- and fifth-speed position $P_{4-5}$ in the sixth step.

According to such start approval/disapproval determination, at the time of starting the engine E, the start is permitted only when the sift drum 95 is at the neutral position $P_N$. When the shift drum is not turned to the neutral position $P_N$ even by the upshift process from the state where the rear gear train GR is not established, or the downshift process does not bring the state where the highest shift stage or the fifth-speed gear train G5 is established into the state where the shift stage lower, by one stage, than the highest shift stage, i.e., the fourth-speed is established, the fail process can be performed as abnormality occurs.

Further, after the start approval/disapproval determination process for the engine E, upon receipt of an engine start signal, the control unit C starts the engine E if the shift drum 95 is at the neutral position $P_N$, and starts the engine E only during receiving the brake operation signal when at least one of the gear trains G1 through G5, GR with the plurality of shift stages is established. Thus, even if the operation is performed to start the engine E after the engine E has been stopped in the established state of the reverse gear train GR or a forward gear train, control can be exercised not to perform forward or rearward movement.

Figure 17:
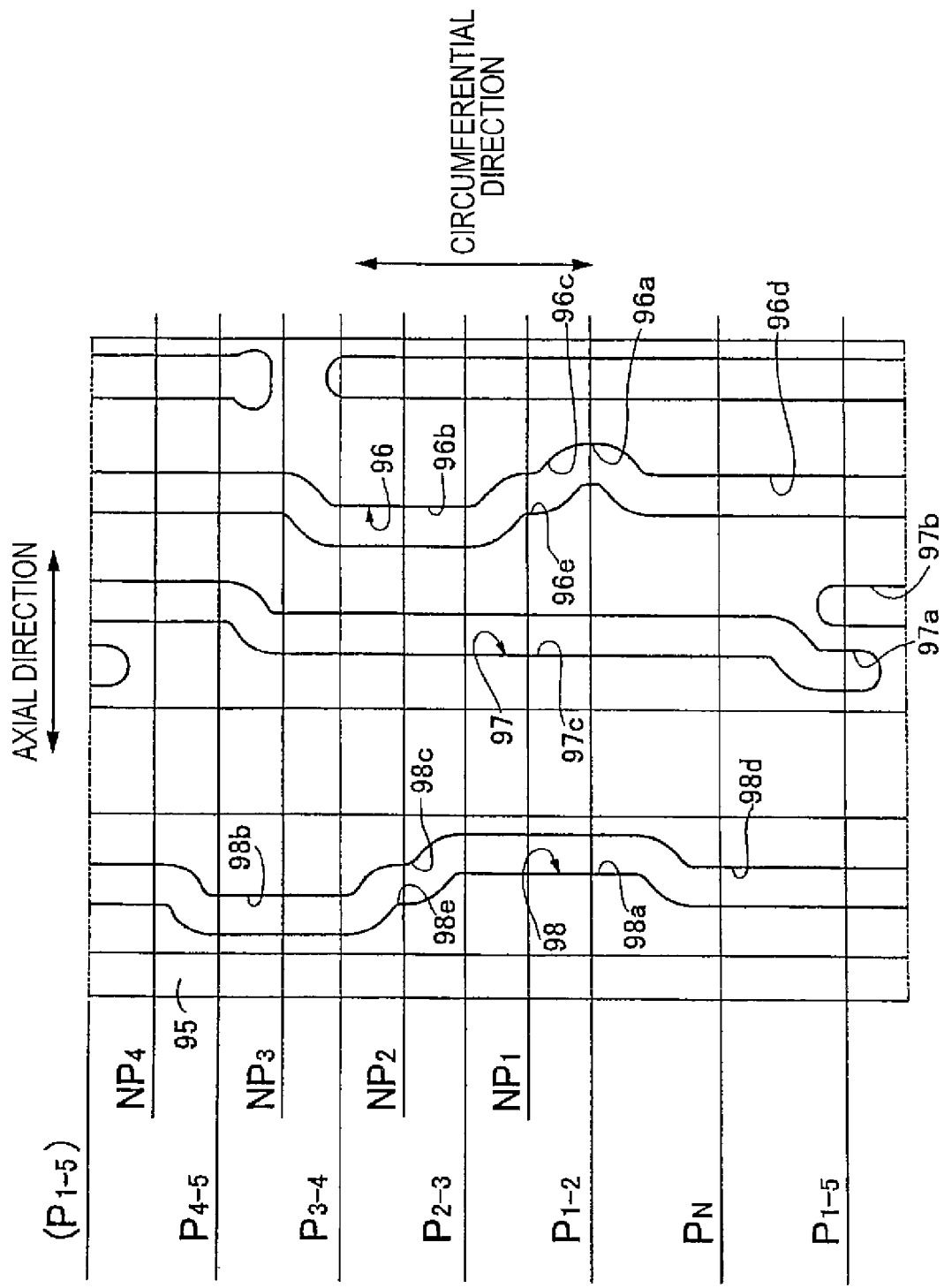
FIG. 17 is a development view of the outer circumferential surface of a shift drum of a second embodiment, corresponding to FIG. 5.

In the embodiment described above, the fifth-speed gear train G5 which is the highest shift stage and the reverse gear train GR are established at the common shift position. However, as in a second embodiment shown in FIG. 17, a first- and fifth-speed position $P_{1-5}$ may be set as a common shift position on a shift drum 95 so as to establish a first-speed gear train G1 and a fifth-speed gear train G5 which is a gear train for highest shift stage.

The embodiments of the present invention have been described thus far. However, the present invention is not limited to the above embodiments and various design modifications can be made without departing from the invention recited in the claims.

For example, the above embodiments describe the vehicle transmission in which the gear trains G1 through G5, GR with the plurality of shift stages are provided between the counter shaft 46 the first and second main shafts 44, 45 to which power is selectively transmitted from the engine E. However, the invention can be applied to a vehicle transmission provided with gear trains with a plurality of shift stages between a single main shaft and a counter shaft.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle transmission comprising:
a plurality of gear trains and a reverse gear train with a plurality of gear stages which can selectively be established;
a shift drum provided on an outer circumference thereof with multiple circumferentially extending lead grooves;
drive means for rotatably driving the shift drum;
shift forks having shift pins slidably engaged with the multiple lead grooves and which switch the established states of the gear trains with the plurality of gear stages according to an operation resulting from turning of the shift drum;
wherein a particular one of the multiple lead grooves on the outer circumference of the shift drum continuously extends beyond one circle of the shift drum, the particular one of the multiple lead grooves having first and second ends that are arranged so as to be out of alignment with each other in an axial direction of the shift drum, and wherein a common shift position adapted to establish the gear trains with two shift stages different from each other is set at one position corresponding to the first and second ends of the particular one lead groove along the circumferential direction of the shift drum.

2. The vehicle transmission according to claim 1, wherein the particular lead groove is formed to be stepwise offset to one side of the shift drum in the axial direction thereof as the particular lead groove goes from the first end of thereof to the second end.

3. The vehicle transmission according to claim 2, wherein the common shift position is set on the shift drum at a position corresponding to both the ends of the particular lead groove so as to establish a reverse gear train or a first-speed gear train and a highest shift stage gear train, the vehicle transmission further comprising a control unit which controls operation of the drive means according to a turning angle detected by a turning angle detector which detects a turning angle of the shift drum, and at the time of operation of the engine, determines that the reverse gear train or the first-speed gear train is established when the shift drum is turned to a downshift side from a shift position adjacent, from an upshift side, to the common shift position, and determines that the highest shift gear train is established when the shift drum is turned to the upshift side from a shift position adjacent, from the downshift side, to the common shift position.

4. The vehicle transmission according to claim 2, wherein the common shift position is set on the shift drum at a position corresponding to both the ends of the particular lead groove so as to establish a reverse gear train and a highest shift gear stage gear train, the vehicle transmission further comprising a control unit which controls operation of the drive means according to a turning angle detected by a turning angle detector which detects a turning angle of the shift drum, and at the time of start of the engine, determines approval/disapproval of start of the engine when the control unit determines that the shift drum is at the common shift position on the basis of a detection result of the turning angle detector.

5. The vehicle transmission according to claim 4, wherein the control unit performs:

a first step, in determining the start approval/disapproval of the engine, of prohibiting the start of the engine in a state where the shift drum is at the common shift position;

a second step of operating the drive means so that the shift drum may be turned to an upshift side by one stage;

a third step of determining whether or not the shift drum has been turned to a shift position adjacent, from the upshift side, to the common shift position in the upshift process of the second step;

a fourth step of permitting the start of the engine if the third step has determined that the shift drum was turned to a neutral position adjacent, from the upshift side, to the common shift position by the upshift process of the second step;

a fifth step of operating the drive means so that the shift drum may be turned to a downshift side when the third step has determined that the shift drum was not turned to the neutral position adjacent, from the upshift side, to the common shift position by the upshift process of the second step;

a sixth step of determining whether or not the shift drum is turned to the shift position adjacent, from the downshift side, to the common shift position by the downshift process of the fifth step;

a seventh step of determining that a gear train corresponding to the shift position adjacent, from the downshift side, to the common shift position is established among the gear trains with a plurality of shift stages when the sixth step confirms that the shift drum has been turned to a shift position adjacent, from the downshift side, to the common shift position; and an eighth step of determining that a fail state arises when the sixth step confirms that the shift drum has not been turned to the shift position adjacent, from the downshift side, to the common shift position.

6. The vehicle transmission according to claim 1, wherein the common shift position is set on the shift drum at a position corresponding to the both ends of the particular lead groove so as to establish a reverse gear train or a first-speed gear train and a highest shift stage gear train, the vehicle transmission further comprising a control unit which controls operation of the drive means according to a turning angle detected by a turning angle detector which detects a turning angle of the shift drum, and at the time of operation of the engine, determines that the reverse gear train or the first-speed gear train is established when the shift drum is turned to a downshift side from a shift position adjacent, from an upshift side, to the common shift position, and determines that the highest shift gear train is established when the shift drum is turned to the upshift side from a shift position adjacent, from the downshift side, to the common shift position.

7. The vehicle transmission according to claim 6, wherein the common shift position is set on the shift drum at a position corresponding to both the ends of the particular lead groove so as to establish a reverse gear train and a highest shift gear stage gear train, and the control unit which controls operation of the drive means according to a turning angle detected by a turning angle detector which detects the turning angle of the shift drum, at the time of start of the engine, determines approval/disapproval of start of the engine when the control unit determines that the shift drum is at the common shift position on the basis of a detection result of the turning angle detector.

8. The vehicle transmission according to claim 1, wherein the common shift position is set on the shift drum at a position corresponding to both the ends of the particular lead groove so as to establish a reverse gear train and a highest shift gear stage gear train, the vehicle transmission further comprising a control unit which controls operation of the drive means according to a turning angle detected by a turning angle detector which detects a turning angle of the shift drum, and at the time of start of the engine, determines approval/disapproval of start of the engine when the control unit determines that the shift drum is at the common shift position on the basis of a detection result of the turning angle detector.

9. The vehicle transmission according to claim 8, wherein the control unit performs:
a first step, in determining the start approval/disapproval of the engine, of prohibiting the start of the engine in a state where the shift drum is at the common shift position;
a second step of operating the drive means so that the shift drum may be turned to an upshift side by one stage;
a third step of determining whether or not the shift drum has been turned to a shift position adjacent, from the upshift side, to the common shift position in the upshift process of the second step;
a fourth step of permitting the start of the engine if the third step has determined that the shift drum was turned to a neutral position adjacent, from the upshift side, to the common shift position by the upshift process of the second step;
a fifth step of operating the drive means so that the shift drum may be turned to a downshift side when the third step has determined that the shift drum was not turned to the neutral position adjacent, from the upshift side, to the common shift position by the upshift process of the second step;
a sixth step of determining whether or not the shift drum is turned to the shift position adjacent, from the downshift side, to the common shift position by the downshift process of the fifth step;
a seventh step of determining that a gear train corresponding to the shift position adjacent, from the downshift side, to the common shift position is established among the gear trains with a plurality of shift stages when the sixth step confirms that the shift drum has been turned to a shift position adjacent, from the downshift side, to the common shift position; and
an eighth step of determining that a fall state arises when the sixth step conforms that the shift drum has not been turned to the shift position adjacent, from the downshift side, to the common shift position.

10. The vehicle transmission according to claim 9, wherein, after the start approval/disapproval determination process for the engine, upon receipt of an engine start signal, the control unit starts the engine if the shift drum is at the neutral position, and starts the engine only during receiving a brake operation signal when at least one of the gear trains with the plurality of shift stages is established.

11. A vehicle transmission comprising:
first- to fifth gear trains and a reverse gear train with a plurality of gear stages which can selectively be established;
a shift drum provided on an outer circumference thereof with first, second, and third circumferentially extending lead grooves;
drive means for rotatably driving the shift drum;
first, second, and third shift forks having shift pins slidably engaged, respectively, with the first, second and third lead groove, the shift forks adapted to switch the established states of the gear trains with the plurality of gear stages according to an operation resulting from turning of the shift drum;
wherein a second lead groove on the outer circumference of the shift drum continuously extends beyond one 360° circle of the shift drum, the second lead groove having first and second ends that are arranged so as to be out of alignment with each other in all axial direction of the shift drum, and
wherein a common shift position adapted to establish the gear trains with two shift stages different from each other is set at one position corresponding to the first and second ends of the second lead groove along the circumferential direction of the shift drum.

12. The vehicle transmission according to claim 11, wherein the second lead groove is formed to be stepwise offset to one side of the shift drum in the axial direction thereof as the second lead groove goes from the first end of thereof to the second end.

13. The vehicle transmission according to claim 12, wherein the common shift position is set on the shift drum at a position corresponding to both the ends of the second lead groove so as to establish a reverse gear train or a first-speed gear train and a highest shift stage gear train,
the vehicle transmission further comprising a control unit which
controls operation of the drive means according to a turning angle detected by a turning angle detector which detects a turning angle of the shift drum, and at the time of operation of the engine,
determines that the reverse gear train or the first-speed gear train is established when the shift drum is turned to a downshift side from a shift position adjacent, from an upshift side, to the common shift position, and
determines that the highest shift gear train is established when the shift drum is turned to the upshift side from a shift position adjacent, from the downshift side, to the common shift position.

14. The vehicle transmission according to claim 12, wherein the common shift position is set on the shift drum at a position corresponding to both the ends of the second lead groove so as to establish a reverse gear train and a highest shift gear stage gear train,
the vehicle transmission further comprising a control unit which
controls operation of the drive means according to a turning angle detected by a turning angle detector which detects a turning angle of the shift drum, and at the time of start of the engine,
determines approval/disapproval of start of the engine when the control unit determines that the shift drum is at the common shift position on the basis of a detection result of the turning angle detector.

15. The vehicle transmission according to claim 14, wherein the control unit performs:
a first step, in determining the start approval/disapproval of the engine, of prohibiting the start of the engine in a state where the shift drum is at the common shift position;
a second step of operating the drive means so that the shift drum may be turned to an upshift side by one stage;
a third step of determining whether or not the shift drum has been turned to a shift position adjacent, from the upshift side, to the common shift position in the upshift process of the second step;
a fourth step of permitting the start of the engine if the third step has determined that the shift drum was turned to a neutral position adjacent, from the upshift side, to the common shift position by the upshift process of the second step;
a fifth step of operating the drive means so that the shift drum may be turned to a downshift side when the third step has determined that the shift drum was not turned to the neutral position adjacent, from the upshift side, to the common shift position by the upshift process of the second step;

a sixth step of determining whether or not the shift drum is turned to the shift position adjacent, from the downshift side, to the common shift position by the downshift process of the fifth step;

a seventh step of determining that a gear train corresponding to the shift position adjacent, from the downshift side, to the common shift position is established among the gear trains with a plurality of shift stages when the sixth step confirms that the shift drum has been turned to a shift position adjacent, from the downshift side, to the common shift position; and an eighth step of determining that a fail state arises when the sixth step confirms that the shift drum has not been turned to the shift position adjacent, from the downshift side, to the common shift position.

16. The vehicle transmission according to claim 11, wherein the common shift position is set on the shift drum at a position corresponding to the both ends of the second lead groove so as to establish a reverse gear train or a first-speed gear train and a highest shift stage gear train, the vehicle transmission further comprising a control unit which controls operation of the drive means according to a turning angle detected by a turning angle detector which detects a turning angle of the shift drum, and at the time of operation of the engine, determines that the reverse gear train or the first-speed gear train is established when the shift drum is turned to a downshift side from a shift position adjacent, from an upshift side, to the common shift position, and determines that the highest shift gear train is established when the shift drum is turned to the upshift side from a shift position adjacent, from the downshift side, to the common shift position.

17. The vehicle transmission according to claim 16, wherein the common shift position is set on the shift drum at a position corresponding to both the ends of the second lead groove so as to establish a reverse gear train and a highest shift gear stage gear train, and the control unit which controls operation of the drive means according to a turning angle detected by a turning angle detector which detects the turning angle of the shift drum, at the time of start of the engine, determines approval/disapproval of start of the engine when the control unit determines that the shift drum is at the common shift position on the basis of a detection result of the turning angle detector.

18. The vehicle transmission according to claim 11, wherein the common shift position is set on the shift drum at a position corresponding to both the ends of the second lead groove so as to establish a reverse gear train and a highest shift gear stage gear train, the vehicle transmission further comprising a control unit which controls operation of the drive means according to a turning angle detected by a turning angle detector which detects a turning angle of the shift drum, and at the time of start of the engine, determines approval/disapproval of start of the engine when the control unit determines that the shift drum is at the common shift position on the basis of a detection result of the turning angle detector.

19. The vehicle transmission according to claim 18, wherein the control unit performs:

a first step, in determining the start approval/disapproval of the engine, of prohibiting the start of the engine in a state where the shift drum is at the common shift position;

a second step of operating the drive means so that the shift drum may be turned to an upshift side by one stage;

a third step of determining whether or not the shift drum has been turned to a shift position adjacent, from the upshift side, to the common shift position in the upshift process of the second step;

a fourth step of permitting the start of the engine if the third step has determined that the shift drum was turned to a neutral position adjacent, from the upshift side, to the common shift position by the upshift process of the second step;

a fifth step of operating the drive means so that the shift drum may be turned to a downshift side when the third step has determined that the shift drum was not turned to the neutral position adjacent, from the upshift side, to the common shift position by the upshift process of the second step;

a sixth step of determining whether or not the shift drum is turned to the shift position adjacent, from the downshift side, to the common shift position by the downshift process of the fifth step;

a seventh step of determining that a gear train corresponding to the shift position adjacent, from the downshift side, to the common shift position is established among the gear trains with a plurality of shift stages when the sixth step confirms that the shift drum has been turned to a shift position adjacent, from the downshift side, to the common shift position; and an eighth step of determining that a fail state arises when the sixth step confirms that the shift drum has not been turned to the shift position adjacent from the downshift side, to the common shift position.

20. The vehicle transmission according to claim 19, wherein, after the start approval/disapproval determination process for the engine, upon receipt of an engine start signal, the control unit starts the engine if the shift drum is at the neutral position, and starts the engine only during receiving a brake operation signal when at least one of the gear trains with the plurality of shift stages is established.

* * * * *